US010618525B2

(12) United States Patent
Yucelen et al.

(10) Patent No.: US 10,618,525 B2
(45) Date of Patent: Apr. 14, 2020

(54) VALIDATING AND COMPUTING STABILITY LIMITS OF HUMAN-IN-THE-LOOP ADAPTIVE CONTROL SYSTEMS

(71) Applicants: University of South Florida, Tampa, FL (US); Northeastern University, Boston, MA (US); Bilkent University, Ankara (TR)

(72) Inventors: Tansel Yucelen, Tampa, FL (US); Yildiray Yildiz, Ankara (TR); Rifat Sipahi, Brookline, MA (US)

(73) Assignee: University of South Florida, Tampa, FL (US)

( * ) Notice: Subject to any disclaimer, the term of this patent is extended or adjusted under 35 U.S.C. 154(b) by 159 days.

(21) Appl. No.: 15/827,633

(22) Filed: Nov. 30, 2017

(65) Prior Publication Data

US 2018/0148069 A1 May 31, 2018

Related U.S. Application Data

(60) Provisional application No. 62/427,882, filed on Nov. 30, 2016.

(51) Int. Cl.
*B60W 50/08* (2012.01)
*G05D 1/02* (2020.01)
(Continued)

(52) U.S. Cl.
CPC ........... *B60W 50/08* (2013.01); *G05B 13/042* (2013.01); *G05D 1/0088* (2013.01);
(Continued)

(58) Field of Classification Search
CPC .. G05B 13/042; G05D 1/0088; G05D 1/0212; B60W 50/08
(Continued)

(56) References Cited

U.S. PATENT DOCUMENTS 9,296,474 B1 * 3/2016 Nguyen ............... G05B 13/048
2009/0118905 A1 * 5/2009 Takenaka ............ B60T 8/17552
701/41
(Continued)

OTHER PUBLICATIONS

Acosta et al., "Piloted evaluation of a control allocation technique to recover from pilot-induced oscillations," J. Guid. Contr. Dyn., 2014, vol. 52, No. 1, pp. 130-140.
(Continued)

*Primary Examiner* — Thomas G Black
*Assistant Examiner* — Luat T Huynh
(74) *Attorney, Agent, or Firm* — Thomas | Horstemeyer, LLP

(57) ABSTRACT

Systems and methods for implementing and/or validating a model reference adaptive control (MRAC) for human-in-the-loop control of a vehicle system. A first operator model is applied to a first feedback-loop-based MRAC scheme, wherein the first operator model is configured to adjust a control command provided as an input to the MRAC scheme based at least in part on an actual action of the vehicle system and a reference action for the vehicle system with a time-delay. A stability limit of a first operating parameter is determined for the MRAC scheme based on the application of the first operator model to the first feedback-loop-based MRAC scheme. The MRAC scheme is validated in response to determining that expected operating conditions of the first operating parameter are within the determined stability limit of the first operating parameter.

14 Claims, 10 Drawing Sheets

(51) Int. Cl.
G05D 1/00 (2006.01)
G05B 13/04 (2006.01)
B60W 50/00 (2006.01)

(52) U.S. Cl.
CPC ... *G05D 1/0212* (2013.01); *B60W 2050/0017* (2013.01); *B60W 2050/0022* (2013.01); *B60W 2400/00* (2013.01); *B60W 2600/00* (2013.01)

(58) Field of Classification Search
USPC .......................................................... 701/41
See application file for complete search history.

(56) References Cited

U.S. PATENT DOCUMENTS

| | | | | |
|---|---|---|---|---|
| 2010/0127132 | A1* | 5/2010 | Kirkland | B64C 13/42 244/76 R |
| 2012/0265367 | A1* | 10/2012 | Yucelen | G05B 13/042 701/1 |
| 2018/0119629 | A1* | 5/2018 | Cline | F02D 41/1402 |

OTHER PUBLICATIONS

Bacon et al., "An optimal control approach to pilot/vehicle analysis and the neal-smith criteria," Journal of Guidance, Control, and Dynamics, 1983, vol. 6, No. 5, pp. 339-347.
Bando et al., "Analysis of optimal velocity model with explicit delay," Physical Review E, 1998, vol. 58, pp. 5429-5435.
Breda et al., "Pseudospectral differencing methods for characteristic roots of delay differential equations," SIAM Journal of Scientific Computing, vol. 27, pp. 482-495, 2006.
Bresch-Pietri et al., "Adaptive trajectory tracking despite unknown input delay and plant parameters," vol. 45, No. 9, pp. 2074-2081, 2009.
Calise et al., "Adaptive loop transfer recovery," Journal of Guidance, Control, and Dynamics, vol. 35, No. 3, pp. 807-815, 2012.
Chen et al., "Frequency sweeping tests for stability independent of delay," IEEE Transactions on automatic control, vol. 40, No. 9, pp. 1640-1645, 1995.
Chowdhary et al., "Concurrent learning adaptive control of linear systems with exponentially convergent bounds," International Journal of Adaptive Control and Signal Processing, vol. 27, No. 4, pp. 280-301, 2013.
Chowdhary et al., "Theory and flight test validation of a concurrent learn-ing adaptive controller," AIAA J. Guid. Contr. Dyn., vol. 34, pp. 592-607, 2010.
Engelborghs et al., "Numerical Bifurcation Analysis of Delay Dif-ferential Equations Using DDE-BIFTOOL," ACM Transactions on Mathematical Software, vol. 1, No. 1, pp. 1-21, 2000.
Green, ""How long does it take to stop?" methodological analysis of driver perception-brake times," Transportation Human Factors, vol. 2, pp. 195-216, 2000.
Gruenwald et al., "On transient performance improvement of adaptive control architectures," International Journal of Control, vol. 88, No. 11, pp. 2305-2315, 2015.
Haddad et al., "Nonlinear impulsive dynamical systems Part I: Stability and dissipativity," in Proc. IEEE Conf. Dec. Contr., Phoenix, AZ, Dec. 1999, pp. 4404-4422, also in Int. J. Contr., vol. 74, pp. 1631-1658, 2001.
Helbing, "Traffic and related self-driven many-particle systems," Reviews of Modern Physics, vol. 73, pp. 1067-1141, 2001.
Ioannou et al., "Instability analysis and improvement of robustness of adap-tive control," Automatica, vol. 20, No. 5, pp. 583-594, 1984.
Klyde et al., "Smart-cue and smart-gain concepts development to alleviate loss of control," Journal of guidance, control, and dynamics, vol. 32, pp. 1409-1417, 2009.
Lewis et al., "Multilayer neural-net robot controller with guaranteed tracking performance," IEEE Trans. Neural Networks, vol. 7, pp. 388-399, 1996.

Lewis et al., "Neural net robot controller with guaranteed tracking performance," IEEE Trans. Neural Networks, vol. 6, pp. 703-715, 1995.
Miller, "Nonlinear dynamic inversion baseline control law: Architecture and perfor-mance predictions," AIAA Guidance, Navigation, and Control Conference, 2011.
Narendra et al., "A new adaptive law for robust adaptation without persistent excitation," IEEE Trans. Autom. Control, vol. 32, No. 2, pp. 134-145, 1987.
Narendra et al., Stable adaptive systems. Courier Corporation, 2012.
Nguyen et al., "An optimal control modification to model-reference adaptive control for fast adaptation," Proc. AIAA Guid., Navig., and Contr. Conf., Honolulu, Hawaii, 2008.
Nguyen et al., "On time delay margin estimation for adaptive control and robust modification adaptive laws," AIAA Guidance, Navigation, and Control Conference, 2011.
Nguyen et al., "Robust adaptive optimal control with large adaptive gain," Proc. Amer. Contr. Conf., St. Louis, MO, 2010.
Nia et al., "Delay-Independent Stable Set-Point Tracking in a LTI Networked Control System with Two Uncertain Delays," Design and Experiments, Portland, Oregon, Jun. 4-6, 2014.
Niculescu et al., "An adaptive smith-controller for time-delay sys-tems with relative degree n≤2," Sys. & Contr. Lett. 49, 2004, pp. 347-358.
Ortega et al., "Globally stable adaptive controller for systems with delay," International Journal of Control 47, 1988, pp. 17-23.
Osburn et al., "New developments in the design of adaptive control systems," Institute of Aeronautical Sciences, 1961, Paper No. 61-39.
Pomet et al., "Adaptive nonlinear regulation: Estimation from Lyapunov equa-tion," IEEE Trans. on Autom. Ctrl., 1992, vol. 37, pp. 729-740.
Richard, "Time-delay systems: an overview of some recent advances and open prob-lems," automatica, 2003, vol. 39, No. 10, pp. 1667-1694.
Richards et al., "Flight-test evaluation of an adap-tive controller for flying qualities specification and protection," Journal of guidance, control, and dynamics, 2015, vol. 38, pp. 2241-2256.
Ryu et al., "Longitudinal flying qualities prediction for nonlinear aircraft," Journal of guidance, control, and dynamics, 2003, vol. 26, No. 3, pp. 474-482.
Sipahi et al., "Stability and stabilization of systems with time delay, limitations and opportunities," IEEE Control Systems Magazine, 2011, vol. 31, No. 1, pp. 38-65.
Stépán et al., "Retarded Dynamical Systems: Stability and Characteristic Function," SIAM Rev., 1991, 33(1), 147-147.
Stépán, "Delay effects in brain dynamics," Philosophical Transactions of the Royal Society A—Mathematical Physical & Engineering Sciences, 2009, vol. 367, No. 1891, pp. 1059-1062.
Treiber et al., "Delays, inaccuracies and anticipation in microscopic traffic models," Physica A, vol. 360, No. 1, pp. 71-88, 2006.
Trujillo et al., "Adaptive controller adaptation time and available control au-thority effects on piloting," NASA Technical Reports Server, 2013.
Trujillo et al., "Adaptive state predictor based human operator modeling on longitudinal and lateral control," in AIAA Modeling and Simulation Technologies Conference, 2015, p. 0654.
Vyhlidal et al., "Mapping based algorithm for large-scale computation of quasi-polynomial zeros," IEEE Transactions on Automatic Control, 2009, vol. 54, Issue 1, pp. 171-177.
Whitaker et al., "Design of model reference control systems for air-craft," Cambridge, MA: Instrumentation Laboratory, Massachusetts Institute of Technology, 1958.
Witte, "An investigation relating longitudinal pilot-induced oscillation tendency rating to describing function predictions for rate-limited actuators," DTIC Document, Tech. Rep., 2004.
Yi et al., Time-delay Systems: Analysis and Control Using the Lambert W Function. World Scientific Publishing Company, 2010.
Yildiz et al., "Adaptive posicast controller for time-delay systems with relative degree n≤2," vol. 46, No. 2, pp. 279-289, 2010.
Yildiz et al., "Stability properties and cross-coupling performance of the control allocation scheme capio," J. Guid. Contr. Dyn., 2011, vol. 34, No. 4, pp. 1190-1196.

(56) References Cited

OTHER PUBLICATIONS

Yucelen et al., "A direct uncertainty minimization framework in model reference adaptive control," in AIAA Guidance, Navigation, and Control Conference, 2015.

Yucelen et al., "A robust adaptive control architecture for disturbance rejection and uncertainty suppression with L ∞ transient and steady-state performance guarantees," International Journal of Adaptive Control and Signal Processing, 2012, vol. 26, No. 11, pp. 1024-1055.

Yucelen et al., "Derivative-free model reference adaptive control," Journal of Guidance, Control, and Dynamics, 2011, vol. 34, No. 4, pp. 933-950.

Yucelen et al., "Evaluation of derivative-free adaptive controller with optimal control modification," in Proceedings of the 2011 AIAA Guidance, Navigation, and Control Conference. Portland, Oregon, 2011.

Yucelen et al., "Improving transient performance of adap-tive control architectures using frequency-limited system error dynamics," International Journal of Control, 2014, vol. 87, No. 11, pp. 2383-2397.

Yucelen et al., "Kalman filter modification in adaptive control," Journal of Guidance, Control, and Dynamics, 2010, vol. 33, No. 2, pp. 426-439.

Yucelen et al., "Low-frequency learning and fast adaptation in model ref-erence adaptive control," Automatic Control, IEEE Transactions on, 2013, vol. 58, No. 4, pp. 1080-1085.

\* cited by examiner

VALIDATING AND COMPUTING STABILITY LIMITS OF HUMAN-IN-THE-LOOP ADAPTIVE CONTROL SYSTEMS

RELATED APPLICATIONS

This application claims the benefit of U.S. Provisional Application No. 62/427,882, filed Nov. 30, 2016, entitled "SYSTEMS AND METHODS FOR COMPUTING STABILITY LIMITS OF HUMAN-IN-THE-LOOP ADAPTIVE CONTROL ARCHITECTURES," the entire contents of which is incorporated herein by reference.

STATEMENT REGARDING FEDERALLY SPONSORED RESEARCH OR DEVELOPMENT

The invention described herein was made in the performance of work under a NASA contract, and is subject to the provisions of Public Law 96-517 (35 USC 202) in which the Contractor has elected to retain title.

BACKGROUND

The present invention relates to adaptive control systems (e.g., for controlling the operation of an automobile, an airplane, etc.) based on observed performance feedback. In particular, certain embodiments of the present invention relate to adaptive control systems that are configured to provide control of a vehicle system in parallel with a human operator.

SUMMARY

Achieving system stability and a level of desired system performance is one of the major challenges arising in control theory when dealing with uncertain dynamical systems. While fixed-gain robust control design approaches can deal with such dynamical systems, the knowledge of system uncertainty bounds is required and characterization of these bounds is not trivial in general due to practical constraints such as extensive and costly verification and validation procedures. On the other hand, adaptive control design approaches are important candidates for uncertain dynamical systems since they can effectively cope with the effects of system uncertainties online and require less modeling information than fixed-gain robust control design approaches.

In various embodiments, the invention provides an adaptive controller; namely, a model reference adaptive controllers (MRAC), where the architecture includes a reference model, a parameter adjustment mechanism, and a controller. In this setting, a desired closed-loop dynamical system behavior is captured by the reference model, where its output (respectively, state) is compared with the output (respectively, state) of the uncertain dynamical system. This comparison yields a system error signal, which is used to drive an online parameter adjustment mechanism. Then, the controller adapts feedback gains to minimize this error signal using the information received from the parameter adjustment mechanism. As a consequence under proper settings, the output (respectively, state) of the uncertain dynamical system behaves as the output (respectively, state) of the reference model asymptotically or approximately in time, and hence, guarantees system stability and achieves a level of desired closed-loop dynamical system behavior.

While MRAC offers mathematical and design tools to effectively cope with system uncertainties arising from ideal assumptions (e.g. linearization, model order reduction, exogenous disturbances, and degraded modes of operations), the capabilities of MRAC when interfaced with human operators can be however quite limited. Indeed, in certain applications when humans are in the loop, the arising closed loop with MRAC can become unstable. As a matter of fact, such problems are not only limited to MRAC-human interactions and have been reported to arise in various human-in-the-loop control problems including, for example, pilot induced oscillations. To address these issues, some control designs may be configured to provide adaptive control as well as smart-cue/smart-gain concepts. On the other hand, an analytical framework aimed at understanding these phenomena and that can ultimately be used to drive rigorous control design is currently lacking. These observations motivate this study where the main objective is to develop comprehensive models from a system-level perspective and analyze such models to develop a strong understanding of the aforementioned stability limits, in particular within the framework of human-in-the-loop MRAC architectures.

With the human-in-the-loop, one critical parameter added to the control problem that can be responsible for instabilities is the human reaction delays. The presence of time delays is a source of instability, which must be carefully dealt with and explicitly addressed in any control design framework. Delay-induced instability phenomenon may occur in numerous applications including robotics, physics, cyber-physical systems, and operational psychology. For example, in physics literature effects of human decision making process and reaction delays are studied to understand the arising car driving patterns, traffic flow characteristics, traffic jams, and stop-and-go waves.

In terms of mathematical modeling of human behavior, many studies focus on developing a representative transfer function of the human in a specific task within a certain frequency band. Along these lines, we cite three key models; i) human driver models, ii) McRuer crossover model, and iii) Neal-Smith pilot model. Human driver models are proposed in the context of car driving, specifically in longitudinal car-following tasks in a fixed lane. While these models vary depending on the degree of their complexity, their simplest form is a pure time delay representing the dead time between arrival of stimulus and reaction produced by the driver. McRuer's model was on the other hand proposed to capture human pilot behavior, to further understand flight stability and human-vehicle integration. Among many of its variations, this model is essentially an integrator dynamics with a time lag to capture human reaction delays and a gain modulated to maintain a specific bandwidth. Similarly, the Neal-Smith pilot model, which is essentially a first order lead-lag type compensator with a gain and time lag, can be utilized to study the behavior of human pilots.

In light of the above discussions, it is of strong interest to understand the limitations of MRAC when coupled with human operators in a closed-loop setting. For this purpose, here MRAC is first incorporated into a general linear human model with reaction delays. Through use of stability theory, this model is then studied to reveal and compute its fundamental stability limit, and the parameter space of the model where such limit is respected—hence MRAC-human combined model produces stable trajectories. An illustrative numerical example of an adaptive flight control application with a Neal-Smith pilot model is utilized next to demonstrate the effectiveness of developed approaches.

In various implementations, the invention provides a comprehensive control theoretic modeling approach, where the dynamic interactions between a general class of human models and MRAC framework can be investigated. In some implementations, this modeling approach focuses on understanding how an ideal MRAC would perform in conjunction with a human model including human reaction delays and how such delays could pose strong limitations to the stabilization and performance of the arising closed-loop human-MRAC architecture. To this end, the examples and discussion provided in this disclosure present various approaches and the pertaining theory with rigorous proofs guaranteeing stability independent of delays and conditions under which stability can be lost. These results pave the way toward studying more complex human models with MRAC, advancing the design of MRAC to better accommodate human dynamics, and driving experimental studies with an analytical foundation.

In one embodiment, the invention provides a method of implementing a model reference adaptive control (MRAC) for a vehicle system. A first operator model is applied to a first feedback-loop-based MRAC scheme, wherein the first operator model is configured to adjust a control command provided as an input to the MRAC scheme based at least in part on an actual action of the vehicle system and a reference action for the vehicle system with a time-delay. A stability limit of a first operating parameter is determined for the MRAC scheme based on the application of the first operator model to the first feedback-loop-based MRAC scheme. The MRAC scheme is validated in response to determining that expected operating conditions of the first operating parameter are within the determined stability limit of the first operating parameter.

In some implementations, the first operating parameter is a time-delay parameter indicative of a delay between the occurrence of an actual action and a corresponding corrective action applied by the operator to a user control. In some such implementations, the expected operating parameters are determined to be within the determined stability limit of the first operating parameter in response to determining that the MRAC scheme will cause the system in response to determining that the MRAC will ensure that operation of the vehicle system will remain stable regardless of the value of the time-delay parameter (i.e., time-delay-independent stability). In other implementations, a range of time-delay values is determined for which the feedback-loop-based MRAC scheme will ensure that operation of the vehicle system remains stable and the MRAC is validated if a range of expected time-delay values for a particular operator, a particular vehicle system, or for all operators is within the determined range of stable time-delay values.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
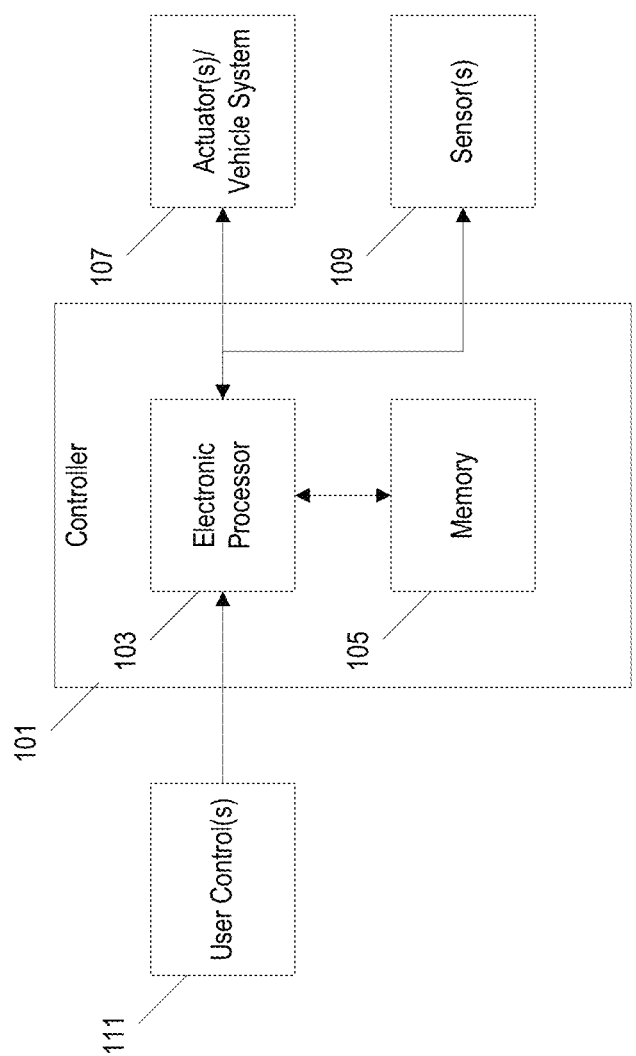
FIG. 1 is a block diagram of a control system for a vehicle according to one embodiment.

FIG. 1 illustrates an example of a human-in-the-loop, feedback-based control system. A controller 101 includes an electronic processor 103 that is communicatively coupled to a computer-readable, non-transitory memory 105. The memory 105 stores instructions that, when executed by the electronic processor 103, causes the controller to provide various functionality of the system including certain functionality as described herein. The controller 101 is communicatively coupled to one or more actuators and/or vehicle systems 107 and is configured to provide a control signal to the actuator(s)/vehicle system 107 to dictate the operation of the actuator(s)/vehicle system 107. The controller 101 is also communicatively coupled to one or more sensors 109 that monitor one or more performance variables/states of the system being controlled by the system of FIG. 1. The controller 101 is also configured to receive a user control input from one or more user control(s) 111.

For example, the system illustrated in FIG. 1 may be implemented in an automobile where the user control 111 includes an steering wheel of the automobile, the actuator(s)/vehicle system 107 includes a steering and/or braking system, and the sensor 109 includes a yaw sensor configured to monitor turning characteristics of the automobile. In another example, the system may be configured to control the steering of an airplane. In still other examples, the system may be configured to control other aspects and/or of other systems.

Figure 2:
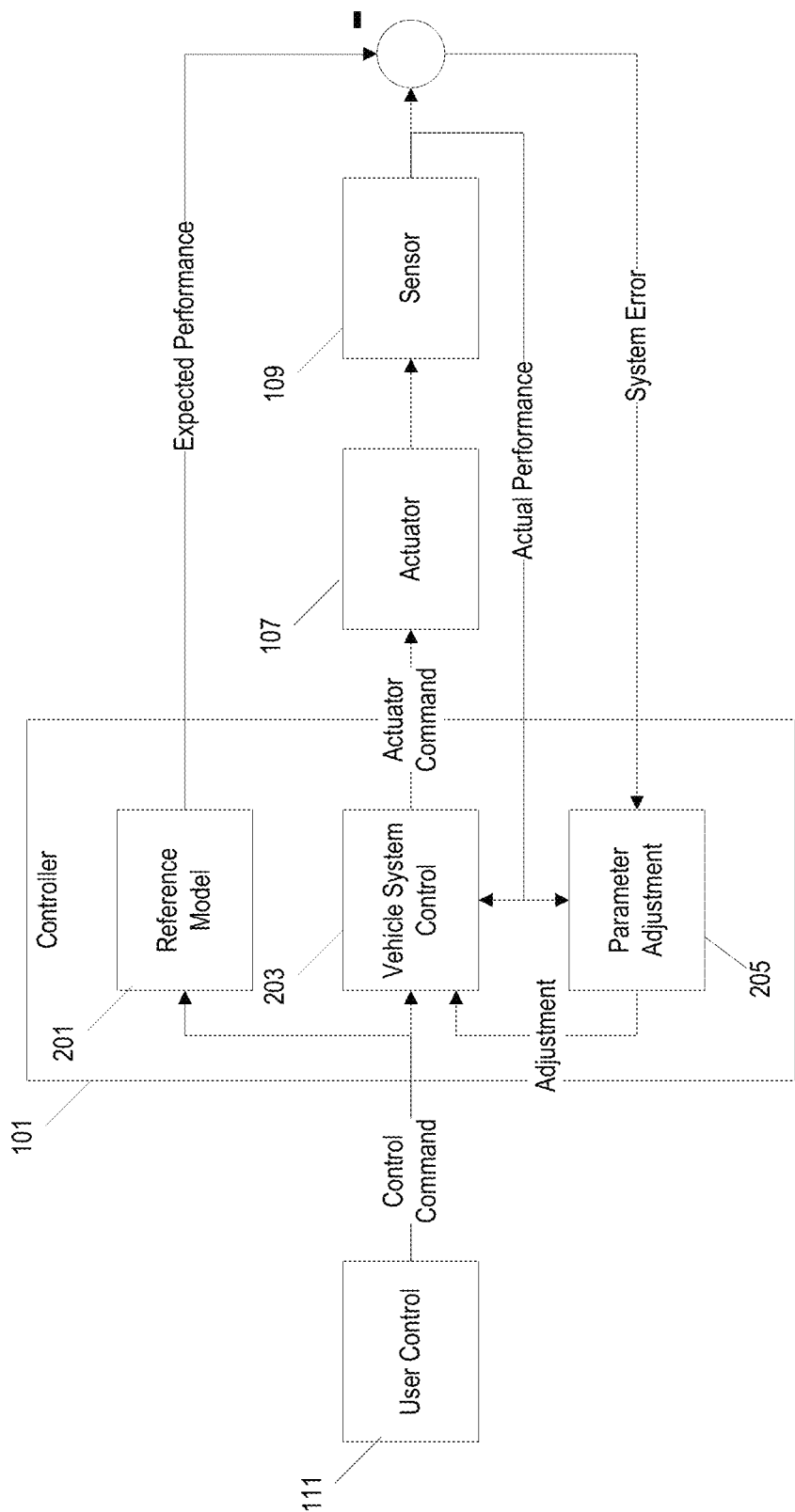
FIG. 2 is a schematic diagram of a method for controlling an operation of a vehicle using a model reference adaptive control (MRAC) in the system of FIG. 1.

FIG. 2 illustrates an example of a method implemented by the controller 101 for controlling the operation of the vehicle using a model reference adaptive controller (MRAC) mechanism. The controller 101 receives a control command from the user control 111 indicative of a desired task to be performed (e.g., adjusting the steering of an airplane or an automobile). The controller 101 applies the control command as an input to a reference model 201 to determine a target behavior or action to be performed in response to the control command from the user control 111. The controller 101 also applies the control command as an input to a vehicle system control 203 that determines an appropriate actuator command, which is then transmitted as a control signal from the controller 101 to the actuator 107. The controller 101 then monitors an output from a sensor 109 to determine how the system responded to the actuator command. The actual performance of the system, as indicated by the output of the sensor 109, is then compared to the expected performance as determined by the reference model 201. The difference between the actual performance and the expected performance is identified as a system error. The controller 101 is configured to apply a parameter adjustment 205 that subsequently adjusts the actuator command provided by the vehicle system control 203 to the actuator 107. In this way, the controller 101 is configured to use feedback to minimize the system error and, as a consequence, the actual performance approaches the expected performance.

The control architecture illustrated in FIG. 2 enables the controller 101 to adapt to changes in the actuator/system itself due to degradation and to adapt to external forces that influence the actual performance of the vehicle in such a way that the system continues to operate as expected (i.e., actual performance matches/approaches expected performance). For example, in an implementation where the system of FIGS. 1 and 2 is provided to control the steering of an airplane, the control command from the user control 111 may indicate that the operator intends to continue to fly straight. However, turbulence or a strong wind may cause the airplane to diverge from its intended course. As a result, the expected performance (i.e., straight travel) will not match/equal the actual performance. Using the MRAC control architecture of FIG. 2, the controller 101 uses feedback from the sensor 109 to adjust the actuator command 107 that is provided to the actuator 107 and, thereby, adapt to account for the strong wind or turbulence.

However, before the controller 101 is able to adjust the actuators 107 in such a way that the actual performance is corrected to match the expected performance, the pilot of the airplane may also notice that the path of travel of the airplane is deviating from its intended straight path. In response, the pilot may adjust the position of the user control 111 in a way intended to offset/correct for the deviation in the path of travel. Accordingly, the controller 101 and the human operator (via the user control 111) both attempt to correct for the system error. However, the human-induced "correction" may inadvertently affect the ability of the controller 101 to correct the system error and, in some cases, the interference of the human-induced correction and the MRAC implemented by the controller 101 may, not only prevent the controller 101 from correcting the system error, but may also cause the steering of the airplane to become unstable.

Figure 3:
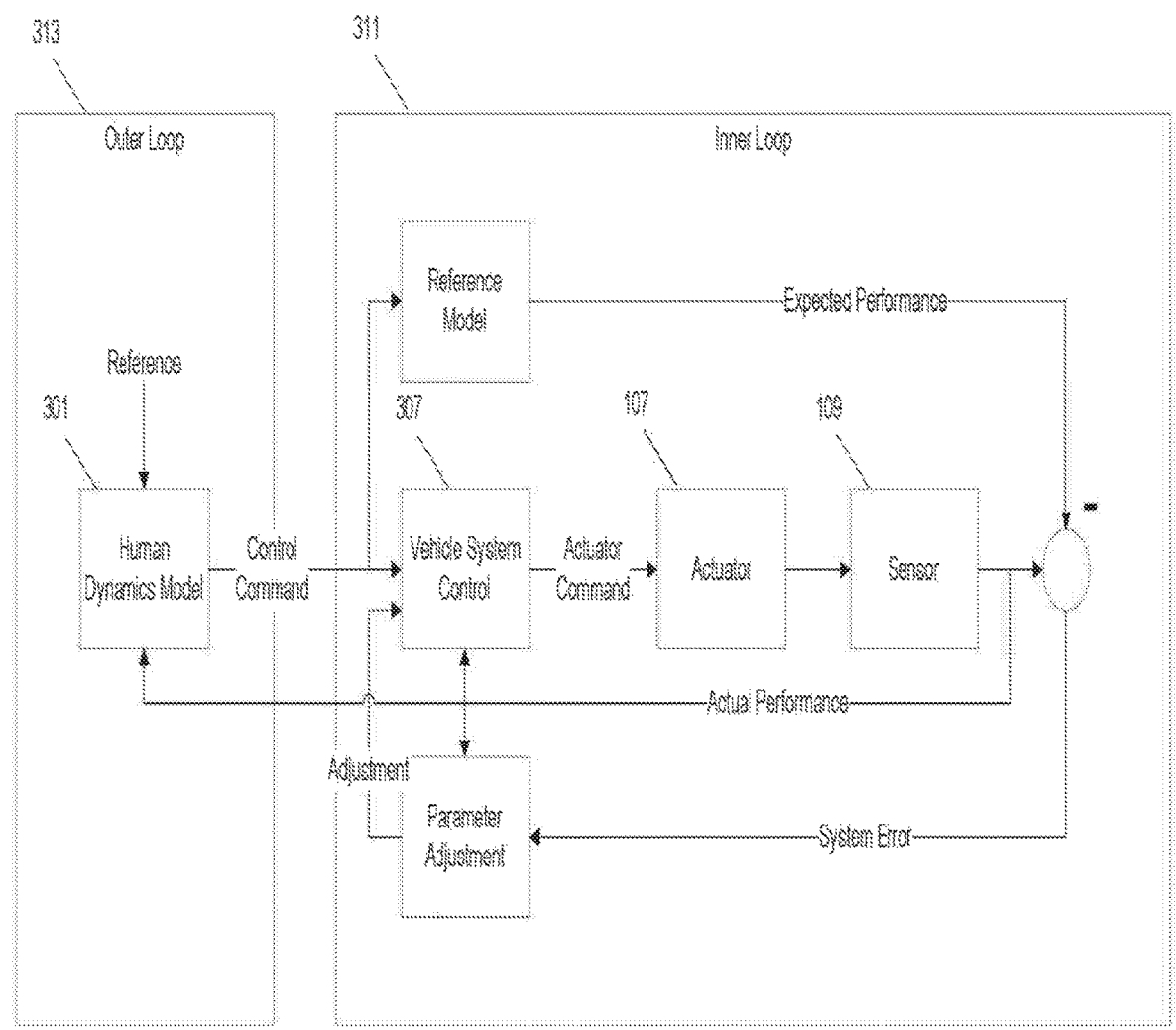
FIG. 3 is a schematic diagram of a method for controlling an operation of a vehicle in order to validate a MRAC in the system of FIG. 1.

To study the effect of human interactions with the MRAC control architecture, the system may be adjusted to apply an additional modeled feedback loop mechanism. For example, a human dynamics model 301, as discussed in further detail below, may be provided as a control model designed to represent an expected human response to detecting an actual performance that does not match the expected performance. In this way, the control architecture provided by the system of FIG. 3 includes an "inner loop" 311, in which the MRAC is applied to correct for deviations between actual performance and expected performance and also includes an "outer loop" 313 in which the control command provided to the vehicle system control 307 is adjusted based on an expected human response. The human dynamics model 301 in the example of FIG. 3 can, in some implementations be implemented on the same controller 101 that is actively applying the MRAC. In other implementations, the human dynamics model 301 is simulated and/or represented mathematically on a separate computer system.

Figure 4:
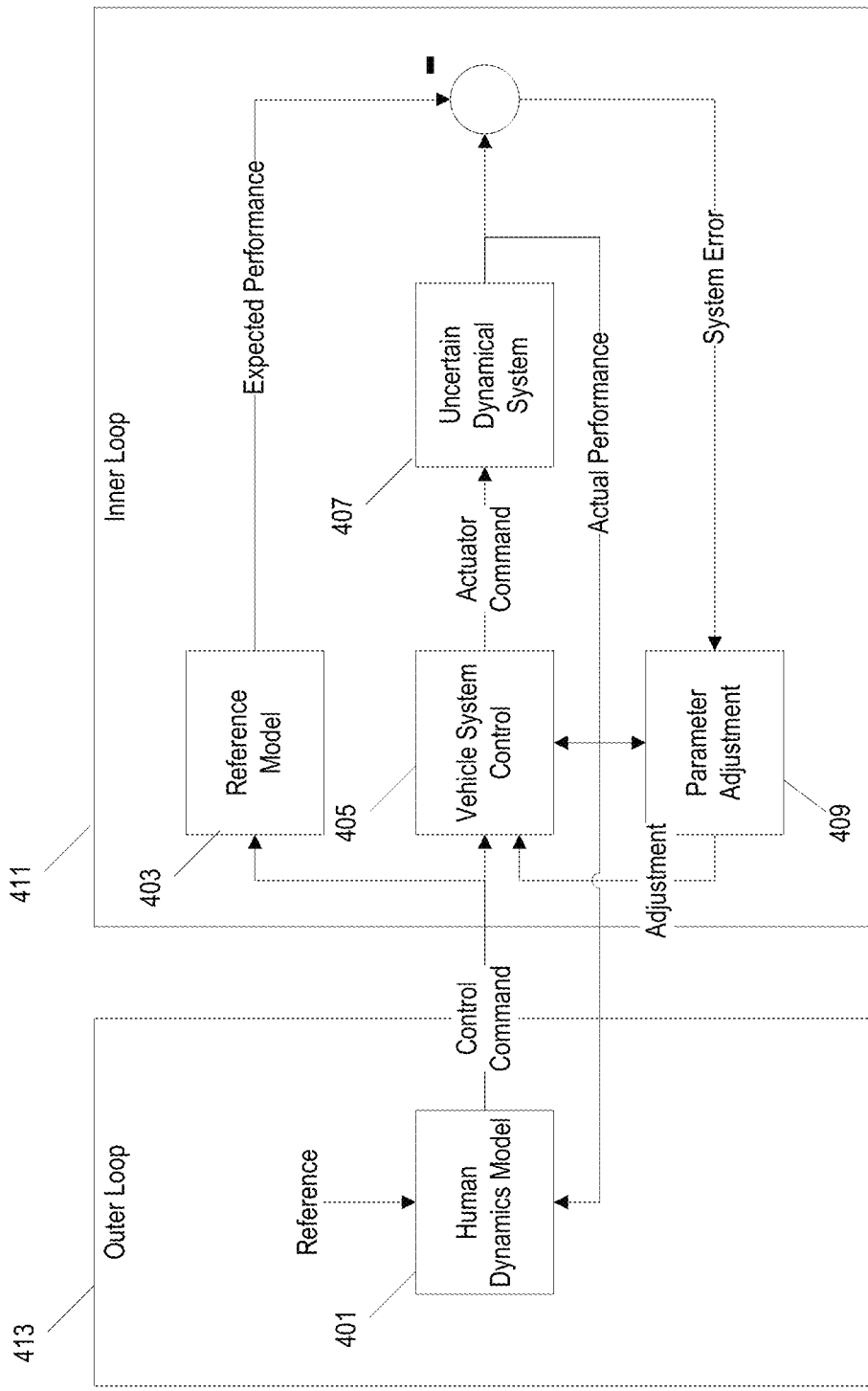
FIG. 4 is a schematic diagram of a method for validating an MRAC for use in the system of FIG. 1 using modeling.

Furthermore, in still other examples, the performance capabilities of the MRAC can be evaluated through modeling instead of through observation of actual system performance. For example, we start with the block diagram configuration given by FIG. 4. In FIG. 4, the outer loop 413 architecture includes the reference that is fed into the human dynamics model 401 to generate a command for the inner loop 411 architecture in response to the variations resulting from the uncertain dynamical system 407. In this setting, the reference input is what the human aims to achieve in a task (e.g., the "expected performance"), and the uncertain dynamical system 407 represents the machine on which this task is being performed. The inner loop 411 architecture includes the uncertain dynamical system 407 as well as the model reference adaptive controller components (i.e., the reference model 403, the parameter adjustment mechanism 409, and the vehicle system control 405). Specifically, at the outer loop 413 architecture, we consider a general class of linear human models with constant time-delay given by $$\dot{\xi}(t) = A_h \xi(t) + B_h \theta(t-\tau),\ \xi(0) = \xi_0 \qquad (1)$$

$$c(t) = C_h \xi(t) + D_h \theta(t-\tau) \qquad (2)$$

where $\xi(t) \in \mathbb{R}^{n_\xi}$ is the internal human state vector, $\tau \in \mathbb{R}_+$ is the internal human time-delay, $A_h \in \mathbb{R}^{n_\xi \times n_\xi}$, $B_h \in \mathbb{R}^{n_\xi \times n_r}$, $C_h \in \mathbb{R}^{n_c \times n_\xi}$, $D_h \in \mathbb{R}^{n_c \times n_r}$, $c(t) \in \mathbb{R}^{n_c}$ is the command produced by the human, which is the input to the inner loop architecture as shown in FIG. 4. Here, input to the human dynamics is given by $$\theta(t) \triangleq r(t) - E_h x(t) \qquad (3)$$

where $\theta(t) \in \mathbb{R}^{n_r}$, with $r(t) \in \mathbb{R}^{n_r}$ being the bounded reference. Here $x(t) \in \mathbb{R}^n$ is the state vector (further details below) and $E_h \in \mathbb{R}^{n_r \times n}$ selects the appropriate states to be compared with $r(t)$. Note that the dynamics given by (1), (2), and (3) is general enough to capture, for example, linear time-invariant human models with time-delay including Neal-Smith model and its extensions.

Next, at the inner loop architecture, we consider the uncertain dynamical system given by $$\dot{x}_p(t) = A_p x_p(t) + B_p \Lambda u(t) + B_p \gamma_p(x_p(t)),\ x_p(0) = x_{p_0} \qquad (4)$$

where $x_p(t) \in \mathbb{R}^{n_p}$ is the accessible state vector, $u(t) \in \mathbb{R}^m$ is the control input, $\delta_p : \mathbb{R}^{n_p} \to \mathbb{R}^m$ is an uncertainty, $A_p \in \mathbb{R}^{n_p \times n_p}$ is a known system matrix, $B_p \in \mathbb{R}^{n_p \times m}$ is a known control input matrix, and $\Lambda \in \mathbb{R}_+^{m \times m} \cap \mathbb{D}^{m \times m}$ is an unknown control effectiveness matrix. Furthermore, we assume that the pair $(A_p, B_p)$ is controllable and the uncertainty is parameterized as $$\delta_p(x_p) = W_p^T \sigma_p(x_p),\ x_p \in \mathbb{R}^{n_p} \qquad (5)$$

where $W_p \in \mathbb{R}^{s \times m}$ is an unknown weight matrix and $\sigma_p : \mathbb{R}^{n_p} \to \mathbb{R}^s$ is a known basis function of the form $\sigma_p(x_p) = [\sigma_{p_1}(x_p), \sigma_{p_2}(x_p), \ldots, \sigma_{p_s}(x_p)]^T$. Note for the case where the basis function $\sigma_p(x_p)$ is unknown, the parameterization in (5) can be relaxed without significantly changing the results of this invention by considering $$\delta_p(x_p) = W_p^T \sigma_p^{nn}(V_p^T x_p) + \varepsilon_p^{nn}(x_p), x_p \in D_{x_p} \quad (6)$$

where $W_p \in \mathbb{R}^{s \times m}$ and $V_p \in \mathbb{R}^{n_p \times s}$ are unknown weight matrices, $\sigma_p^{nn}: D_{x_p} \to \mathbb{R}^s$ is a known basis composed of neural networks function approximators, $\varepsilon_p^{nn}: D_{x_p} \to \mathbb{R}^m$ is an unknown residual error, and $D_{x_p}$ is a compact subset of $\mathbb{R}^{n_p}$.

To address command following at the inner loop architecture, let $x_c(t) \in \mathbb{R}^{n_c}$ be the integrator state satisfying $$\dot{x}_c(t) = E_p x_p(t) - c(t), x_c(0) = x_{c_0} \quad (7)$$

where $E_p \in \mathbb{R}^{n_c \times n_p}$ allows to choose a subset of $x_p(t)$ to be followed by c(t). Now, (4) can be augmented with (7) as $$\dot{x}(t) = Ax(t) + B\Lambda u(t) + BW_p^T \sigma_p(x_p(t)) + B_r c(t), x(0) = x_0 \quad (8)$$

where $$A \triangleq \begin{bmatrix} A_p & 0_{n_p \times n_c} \\ E_p & 0_{n_c \times n_c} \end{bmatrix} \in \mathbb{R}^{n \times n} \quad (9)$$

$$B \triangleq [B_p^T, 0_{n_c \times m}^T]^T \in \mathbb{R}^{n \times m} \quad (10)$$

$$B_r \triangleq [0_{n_p \times n_c}^T, -I_{n_c \times n_c}]^T \in \mathbb{R}^{n \times n_c} \quad (11)$$

and $x(t) \triangleq [x_p^T(t), x_c^T(t)]^T \in \mathbb{R}^n$ is the augmented state vector, $x_0 \triangleq [x_{p_0}^T, x_{c_0}^T]^T \in \mathbb{R}^n$, and $n = n_p - n_c$. In this inner loop architecture setting, it is practically reasonable to set $E_h = [E_{h_p}, 0_{n_r \times n_c}]$, $E_{h_p} \in \mathbb{R}^{n_r \times n_p}$, in (3) without loss of theoretical generality since a subset of the accessible state vector is usually available and/or sensed by the human at the outer loop (but not the states of the integrator).

Finally, consider the feedback control law at the inner loop architecture given by $$u(t) = u_n(t) + u_a(t) \quad (12)$$

where $u_n(t) \in \mathbb{R}^m$ and $u_a(t) \in \mathbb{R}^m$ are the nominal and adaptive control laws, respectively. Furthermore, let the nominal control law be $$u_n(t) = -Kx(t) \quad (13)$$

with $K \in \mathbb{R}^{m \times n}$, such that $A_r \triangleq A - BK$ is Hurwitz. For instance, such K exists if and only if (A,B) is a controllable pair. Using (12) and (13) in (8) next yields $$\dot{x}(t) = A_r x(t) + B_r c(t) + B\Lambda[u_a(t) + W^T \sigma(x(t))] \quad (14)$$

where $W^T \triangleq [\Lambda^{-1} W_p^T, (\Lambda^{-1} - I_{m \times m}) K] \in \mathbb{R}^{(s+n) \times m}$ is an unknown aggregated weight matrix and $\sigma^T(x(t)) \triangleq [\sigma_p^T(x_p(t)), x^T(t)] \in \mathbb{R}^{s+n}$ is a known aggregated basis function. Considering (14), let the adaptive control law be $$u_a(t) = -\hat{W}^T(t) \sigma(x(t)) \quad (15)$$

where $\hat{W}(t) \in \mathbb{R}^{(s+n) \times m}$ is the estimate of W satisfying the parameter adjustment mechanism $$\dot{\hat{W}}(t) = \gamma \sigma(x(t)) e^T(t) PB, \hat{W}(0) = \hat{W}_0 \quad (16)$$

where $\gamma \in \mathbb{R}_+$ is the learning rate, and system error reads, $$e(t) \triangleq x(t) - x_r(t) \quad (17)$$

with $x_r(t) \in \mathbb{R}^n$ being the reference state vector satisfying the reference system $$\dot{x}_r(t) = A_r x_r(t) + B_r c(t), x_r(0) = x_{r_0} \quad (18)$$

and $P \in \mathbb{R}_+^{n \times n} \cap \mathbb{S}^{n \times n}$ is a solution of the Lyapunov equation $$0 = A_r^T P + PA_r + R \quad (19)$$

with $R \in \mathbb{R}_+^{n \times n} \cap \mathbb{S}^{n \times n}$. Since $A_r$ is Hurwitz, it follows that there exists a unique $P \in \mathbb{R}^{n \times n} \cap \mathbb{S}^{n \times n}$ satisfying (19) for a given $R \in \mathbb{R}_+^{n \times n} \cap \mathbb{S}^{n \times n}$. Although we consider a specific yet widely studied parameter adjustment mechanism given by (16), one can also consider other types of parameter adjustment mechanisms without changing the essence of this invention.

Based on the given problem formulation, the next section analyzes the stability of the coupled inner and outer loop architectures depicted in FIG. 4 in order to establish a fundamental stability limit for guaranteeing the closed-loop system stability (when this limit is satisfied by the given human model at the outer loop and the given adaptive controller at the inner loop).

Fundamental Stability Limit Calculation

To analyze the stability of the coupled inner and outer loop architectures introduced in the previous section, we first write the system error dynamics using (14), (15), and (18) as $$\dot{e}(t) = A_r e(t) - B\Lambda \tilde{W}^T(t) \sigma(x(t)), e(0) = e_0 \quad (20)$$

where $$\tilde{W}(t) \triangleq \hat{W}(t) - W \in \mathbb{R}^{(s+n) \times m} \quad (21)$$

is the weight error and $e_0 \triangleq x_0 - x_{r_0}$. In addition, we write the weight error dynamics using (16) as $$\dot{\tilde{W}}(t) = \gamma \sigma(x(t)) e^T(t) PB, \tilde{W}(0) = \tilde{W}_0 \quad (22)$$

where $\tilde{W}_0 \triangleq \hat{W}(0) - W$. The following lemma is now immediate.

Lemma 1.

Consider the uncertain dynamical system given by (4) subject to (5), the reference model given by (18), and the feedback control law given by (12), (13), (15), and (16). Then, the solution $(e(t), \tilde{W}(t))$ is Lyapunov stable for all $(e_0, \tilde{W}_0) \in \mathbb{R}^n \times \mathbb{R}^{(s+n) \times m}$ and $t \in \mathbb{R}_+$.

Proof.

To show Lyapunov stability of the solution $(e(t), \tilde{W}(t))$ given by (20) and (22) for all $(e_0, \tilde{W}_0) \in \mathbb{R}^n \times \mathbb{R}^{(s+n) \times m}$ and $t \in \mathbb{R}_+$, consider the Lyapunov function candidate $$V(e, \tilde{W}) = e^T Pe + \gamma^{-1} tr(\tilde{W}\Lambda^{1/2})^T (\tilde{W}\Lambda^{1/2}) \quad (23)$$

Note that $V(0,0) = 0, V(e, \tilde{W}) > 0$ for all $(e, \tilde{W}) \neq (0,0)$, and $V(e, \tilde{W})$ is radially unbounded. Differentiating (23) along the trajectories of (20) and (22) yields $$\dot{V}(e(t), \tilde{W}(t)) = -e^T(t) Re(t) \leq 0 \quad (24)$$

where the result is now immediate.

Since the solution $(e(t), \tilde{W}(t))$ is Lyapunov stable for all $(e_0, \tilde{W}_0) \in \mathbb{R}^n \times \mathbb{R}^{(s+n) \times m}$ and $t \in \mathbb{R}_+$ from Lemma 1, this implies that $e(t) \in L_\infty$ and $\tilde{W}(t) \in L_\infty$. At this stage in our analysis, it should be noted that one cannot use the Barbalat's lemma to conclude $\lim_{t \to \infty} e(t) = 0$. To elucidate this point, one can write $$\ddot{V}(e(t), \tilde{W}(t)) = -2e^T(t) R[A_r e(t) - B\Lambda \tilde{W}^T(t) \sigma(e(t) + x_r(t))] \quad (25)$$

where since $x_r(t)$ can be unbounded due to the coupling between the inner and outer loop architectures, one cannot conclude the boundedness of (25), which is necessary for utilizing the Barbalat's lemma in (24). Motivated from this standpoint, we next provide the conditions to ensure the boundedness of the reference model states $x_r(t)$, which also reveal the fundamental stability limit (FSL) for guaranteeing the closed-loop system stability. It is noted that two FSLs are provided below; namely, a delay-independent FSL and a delay-dependent FSL.

Delay-Independent FSL

A linear time invariant system subject to time delay can in some cases be stable regardless of how large the time delay $\tau$ is. We present the mathematical conditions under which the system at hand can be delay-independent stable. For this, start with using (2) in (18), and first write $$\dot{x}_r(t) = A_r x_r(t) + B_r(C_h \xi(t) + D_h \theta(t-\tau)), \quad (26)$$
$$= A_r x_r(t) - B_r D_h E_h x_r(t-\tau) + B_r C_h \xi(t) -$$
$$B_r D_h E_h e(t-\tau) + B_r D_h r(t-\tau)$$

Next, it follows from (1) that $$\dot{\xi}(t) = A_h \xi(t) - B_h E_h x_r(t-\tau) - B_h E_h e(t-\tau) + B_h r(t-\tau) \quad (27)$$

Finally, by letting $\varphi(t) \triangleq [x_r^T(t), \xi^T(t)]^T$, and using (26) and (27), one can write $$\dot{\varphi}(t) = A_0 \varphi(t) + A_\tau \varphi(t-\tau) + \phi(\cdot), \quad \varphi(0) = \varphi_0 \quad (28)$$

where $$A_0 \triangleq \begin{bmatrix} A_r & B_r C_h \\ 0_{n_\xi \times n} & A_h \end{bmatrix} \in \mathbb{R}^{(n+n_\xi) \times (n+n_\xi)} \quad (29)$$

$$A_\tau \triangleq \begin{bmatrix} -B_r D_h E_h & 0_{n \times n_\xi} \\ -B_h E_h & 0_{n_\xi \times n_\xi} \end{bmatrix} \in \mathbb{R}^{(n+n_\xi) \times (n+n_\xi)} \quad (30)$$

$$\phi(\cdot) \triangleq \begin{bmatrix} -B_r D_h E_h e(t-\tau) + B_r D_h r(t-\tau) \\ -B_h E_h e(t-\tau) + B_h r(t-\tau) \end{bmatrix} \in \mathbb{R}^{n+n_\xi} \quad (31)$$

As a consequence of Lemma 1 and the boundedness of the reference r(t), one can conclude that $\phi(\cdot) \in L_\infty$. We now state the following lemma that is necessary for the main result of this invention.

LEMMA 2. Let $P \in \mathbb{R}_+^{(n+n_\xi) \times (n+n_\xi)} \cap S^{(n+n_\xi) \times (n+n_\xi)}$ and $S \in \mathbb{R}_+^{(n+n_\xi) \times (n+n_\xi)} \cap S^{(n+n_\xi) \times (n+n_\xi)}$ such that the linear matrix inequality (LMI)

$$F \triangleq \begin{bmatrix} A_0^T P + P A_0 + S & P A_\tau \\ A_\tau^T P & -S \end{bmatrix} < 0 \quad (32)$$

holds. Then, $\varphi(t)$ of the dynamical system given by (28) is bounded for any $\tau \in \mathbb{R}_+$ and for all $\varphi(t) \in \mathbb{R}^{n+n_\xi}$ and $\tau \in \mathbb{R}_+$.

PROOF. Consider the Lyapunov-Krasovskii functional candidate given by $$V(\varphi) = \varphi^T P \varphi + \int_{-\tau}^{0} \varphi^T(t+\mu) d\mu \quad (33)$$

and, since $\phi(\cdot) \in L_\infty$, let $\varphi^* \in \mathbb{R}_+$ be such that $\|\phi(\cdot)\|_2 \leq \varphi^*$. Differentiating (33) along the trajectory of (28) yields $$\dot{V}(\varphi(t)) \leq \eta^T(t) F \eta(t) + 2\lambda_{max}(P) \varphi^* \|\eta(t)\|_2 \quad (34)$$

where $\eta(t) \triangleq [\varphi^T(t), \varphi^T(t-\tau)]^T$. Since (32) holds, let $k \in \mathbb{R}_+$ be such that $k \triangleq -\lambda_{min}(F)$. Now, it follows from (34) that $$\dot{V}(\varphi(t)) \leq -k \|\eta(t)\|_2 (\|\eta(t)\|_2 - 2k^{-1} \lambda_{max}(P) \varphi^*) \quad (35)$$

and hence, there exists a compact set $R \triangleq (\{\eta(t) \in \mathbb{R}^{2(n+n_\xi)} : \|\eta(t)\|_2 \leq 2k^{-1} \lambda_{max}(P) \varphi^*\}$ such that $\dot{V}(\varphi(t)) \leq 0$ outside of this set, which proves the boundedness of (28) for any $\tau \in \mathbb{R}_+$ and for all $\varphi(0) \in \mathbb{R}^{n+n_\xi}$ and $\tau \in \mathbb{R}_+$.

Lemma 2 establishes the boundedness of not only the reference model states, the dynamics of which are given by (18), but also the internal human dynamics given by (1), and hence, $x_r(t) \in L_\infty$ and $\xi(t) \in L_\infty$.

Theorem 1.

Consider the uncertain dynamical system given by (4) subject to (5), the reference model given by (18), the feedback control law given by (12), (13), (15), and (16), and the human dynamics given by (1), (2), and (3). Then, $e(t) \in L_\infty$ and $\tilde{W}(t) \in L_\infty$. If, in addition, there exist $P \in \mathbb{R}_+^{(n+n_\xi) \times (n+n_\xi)} \cap S^{(n+n_\xi) \times (n+n_\xi)}$ and $S \in \mathbb{R}_+^{(n+n_\xi) \times (n+n_\xi)} \cap S^{(n+n_\xi) \times (n+n_\xi)}$ such that the LMI given by (32) holds, then $x_r(t) \in L_\infty$, $\xi(t) \in L_\infty$, and $\lim_{t \to \infty} e(t) = 0$.

Proof.

As a consequence of Lemma 1, recall that $e(t) \in L_\infty$ and $\tilde{W}(t) \in L_\infty$. In addition, note that $\phi(\cdot) \in L_\infty$ in (28). Next, if there exist $P \in \mathbb{R}_+^{(n+n_\xi) \times (n+n_\xi)} \cap S^{(n+n_\xi) \times (n+n_\xi)}$ and $S \in \mathbb{R}_+^{(n+n_\xi) \times (n+n_\xi)} \cap S^{(n+n_\xi) \times (n+n_\xi)}$ such that the LMI given by (32) holds, recall from Lemma 2 that $x_r(t) \in L_\infty$ and $\xi(t) \in L_\infty$. Finally, since $e(t) \in L_\infty$, $x_r(t) \in L_\infty$, and $\tilde{W}(t) \in L_\infty$ ensure the boundedness of (25), it now follows from the Barbalat's lemma that $\lim_{t \to \infty} e(t) = 0$.

For the boundedness of all closed-loop system signals and $\lim_{t \to \infty} e(t) = 0$, Theorem 1 requires the fundamental stability limit given by the LMI (32) to hold. Note that this fundamental stability limit can be equivalently written in an equality form as $$0 = A_0^T P + P A_0 + A_\tau S^{-1} A_\tau^T P + S + Q \quad (36)$$

where $P \in \mathbb{R}_+^{(n+n_\xi) \times (n+n_\xi)} \cap S^{(n+n_\xi) \times (n+n_\xi)}$, $S \in \mathbb{R}_+^{(n+n_\xi) \times (n+n_\xi)} \cap S^{(n+n_\xi) \times (n+n_\xi)}$, and $Q \in \mathbb{R}_+^{(n+n_\xi) \times (n+n_\xi)} \cap S^{(n+n_\xi) \times (n+n_\xi)}$ with $A_0$ and $A_\tau$ respectively given by (29) and (30). Importantly, in addition, note that $A_0$ and $A_\tau$ do not depend on any unknown parameters and they only depend on the given set of human model and reference model parameters. As a consequence, for a given human model of the form (1), (2), and (3), if the fundamental stability limit given by (36) (or, equivalently (32)) holds with respect to a judiciously chosen reference model parameters, then the closed-loop system trajectories are guaranteed to be stable.

Notice above that we have employed a time-domain technique based on a Lyapunov-Krasovskii functional to prove delay independent stability. A large body of literature was devoted to this effort where one main focus was to reduce the inherent conservatism imposed by the choice of candidate functionals. Another method would be to employ frequency domain tools where one instead studies the eigenvalues of the corresponding linear time invariant system with time delay. For example, consider the nominal part of (28); e.g., $\phi(\cdot) = 0$, with $\tau \to \infty$. In this case, the system will behave like an open loop system whose stability is determined by the eigenvalues of $A_0$. For the system to be stable in this setting, $A_0$ must be Hurwitz, which also makes it invertible. Next, we note that the characteristic function of the dynamical system $$f := \det[sI - A_0 - A_\tau e^{-s\tau}] \quad (37)$$

can be rearranged as $$\det[I - (sI - A_0)^{-1} A_\tau e^{-s\tau}] * \det[sI - A_0] \quad (38)$$

Note that for the class of time-delay systems being considered here, as a parameter of interest; e.g., delay, changes, the system can switch from a stable to unstable regime (or vice versa) if and only if the system has imaginary eigenvalues $s = j\omega$. Investigation of whether or not such a switch could arise then requires studying the zeros of the system characteristic function (38) at $s = j\omega$, where $\omega < 0$ without loss of generality. On the imaginary axis however only the first determinant can be zero since the second determinant is always non-zero owing to $A_0$ being Hurwitz. Denoting with $\rho(.)$ the spectral radius and noticing that $|e^{-j\omega\tau}|=1$, we have the following theorem.

Theorem 2.

The dynamical system given by (28) with $\varphi(.)=0$ is asymptotically stable independent of delay if and only if
  i) $A_0$ is asymptotically stable;
  ii) $\rho((j\omega I-A_0)^{-1}A_\tau)<1$, $\forall\omega>0$; and
  iii) either a) $\rho(A_0^{-1}A_\tau)<1$ or b) $\rho(A_0^{-1}A_\tau)=1$ and $\det(A_0+A_\tau)\neq 0$.

Implementing the steps in the above theorem are straightforward. Condition i) can be checked by a standard eigenvalue computation, while condition ii) requires sweeping of the frequency $\omega>0$. Here one generates the matrix $(j\omega I-A_0)^{-1}A_\tau$ and for a given $\omega$, computes the eigenvalues. If all these eigenvalues fall into the unit circle then condition ii) is satisfied for this $\omega$. This process is repeated for all $\omega$. Note that the inverse matrix operation here will guarantee that, for sufficiently large $\omega$, condition ii) will always be satisfied as the spectral radius will keep shrinking. Checking of condition iii) is much simpler as it does not require parametric scanning but only computation of eigenvalues. Note that condition iii) is the special case of condition ii) computed at $\omega=0$.

Corollary 1.

Let the human dynamics given by (1), (2), and (3) be a single-input single-output system (SISO) with gain $k_p$. Then, for (28) with $\varphi(.)=0$ to be delay-independent stable, it is necessary that $$k_p < \frac{1}{\rho(A_r^{-1}B_rE_h)} \quad (39)$$

holds.

Proof.

Start with (29) and (30) and rewrite the characteristic function (37) explicitly as $$f:=\det[sI-A_r+B_r(C_h(sI-A_h)^{-1}B_h+D_h)E_h e^{-\tau s}] \quad (40)$$

which simplifies to $$f:=\det[sI-A_r+B_rE_hG(s)e^{-\tau s}] \quad (41)$$

where $G(s)$ is the scalar transfer function corresponding to the SISO system given by (1) and (2). Note that the above expression is in the exact form as (37); hence, for (28) with $\varphi(.)=0$ to be delay-independent stable, it is necessary that condition i) of Theorem 2 holds, which in this case requires that $A_r$ must be Hurwitz. As per the construction in (13) this always holds. Then, invoking condition ii) in Theorem 2 at $\omega=0$, and recalling that $k_p=G(0)$, we have $$\rho((-A_r)^{-1}(B_rE_h)G(0))<1 \quad (42)$$

which gives (39), and hence, the proof is now complete.

It is worthy to note that the results in Corollary 1 can be further improved in many practical situations. For example, observe that the reference input to the human model and the human command are of dimension one in the SISO case. In addition, since generally the outer loop and inner loop command following objectives are the same, note that $E_{h_p}=E_p$. Thus, in view of these, the following result is now immediate.

Corollary 2.

Given $E_{h_p}=E_p$ and under the conditions in Corollary 1, the necessary condition for the human-in-the loop MRAC model (28) with $\varphi(.)=0$ to be delay-independent stable is given by $$k_p<1 \quad (43)$$

Proof.

Note that $A_r^{-1}B_r$ and $E_h$ in (39) are column vectors. Therefore, we have $\rho(A_r^{-1}B_rE_h)=|E_hA_r^{-1}B_r|$. Since in the scalar case, $E_hA_r^{-1}B_r=-1$, then (43) follows.

In the above corollary, we prove that the human gain must be less than one such that (28) with $\varphi(.)=0$ can have a chance to be delay-independent stable. The sufficiency can be numerically checked by studying condition ii) of Theorem 2 (see the next section). What is interesting in the above analysis is that human's aggressiveness as measured by $k_p$ can be a strong limiting factor that ruins delay-independent stability. In the case when MRAC deals with a highly aggressive human behavior with $k_p>1$, it is impossible to avoid instability for some delay values $\tau$. Moreover, since by the design of stable MRAC we have zero steady-state error in tracking, the necessary condition $k_p<1$ is solely inherent to the human's gain and holds irrespective of the controller gain K. While in many cases it is reasonable to assume that the human model can be considered as SISO dynamics; e.g., when the human produces a single output to steer a manipulator, in the case when an auto-human model is utilized in multi-input multi-output (MIMO) form, the necessary condition (42) can be revised as follows $$\rho(A_r^{-1}B_r[G(0)]E_h)<1 \quad (44)$$

where $[G(0)]$ denotes the matrix transfer function of the MIMO auto-human model with $s=0$ in its all entries.

It is important to note that while guaranteeing delay-independent stability in a dynamical system is attractive as this makes the system completely immune to destabilizing effects of delays, in some cases by the nature of the problem, delay-independent stability cannot be possible as is the case above for $k_p>1$. Moreover, a trade-off in delay-independent stable cases is system's performance, which may deteriorate for large delays although stability is preserved. In light of this, we now turn our attention to the case when delay-independent stability is not possible, or not desired, and hence, system stability is affected by the numerical value of the delay in the dynamical system.

Delay Dependent FSL

Delay-independent FSL given in the previous section guarantees the boundedness of all closed loop system signals and $\lim_{t\to\infty} e(t)=0$ for any $\tau\in\mathbb{R}_+$. Since the time delay in human dynamics can in general be known in practice for certain applications, at least within a certain range, it is possible to relax these conditions by utilizing the delay information in the stability analysis. Towards this goal, we first provide the following lemma.

Lemma 3.

Consider the following system dynamics given by $$\dot{z}(t)=Fz(t)+Gz(t-\tau)+h(t,z(t)), z(0)=z_0 \quad (45)$$

where $z(t)\in\mathbb{R}^n$ is the state vector, $F\in\mathbb{R}^{n\times n}$ and $G\in\mathbb{R}^{n\times n}$ are constant matrices, $\tau$ is the time delay, and $h(t, z(t))$ is piecewise constant and bounded nonlinear forcing term, which is in general a function of state z. If the homogeneous dynamical system given by $$\dot{z}(t)=Fz(t)+Gz(t-\tau) \quad (46)$$

is asymptotically stable, then the states of the original inhomogeneous dynamical system given by (45) remains bounded for all times.

Proof.

Since h(t, z(t)) is piecewise continuous and bounded, this signal can be considered as an exogenous input to the system with the transfer function $$G(s)=(sI-(F+Ge^{-\tau s}))^{-1} \quad (47)$$

Under the assumption that the homogeneous system (46) is asymptotically stable, then we have that all of the infinitely many roots of the characteristic equation $$\det(sI-(F+Ge^{-\tau s}))=0 \quad (48)$$

of the system (47), have strictly negative real parts. Therefore, the output z(t) of the dynamical system remains bounded.

Having established Lemma 3, we are now ready to state the second main result of this invention, which provides a more relaxed delay-dependent stability condition for the overall human-in-the-loop system and convergence of the system error, e(t), to zero.

Theorem 3.

Consider the uncertain dynamical system given by (4) subject to (5), the reference model given by (18), the feedback control law given by (12), (13), (15), and (16), and the human dynamics given by (1), (2), and (3). Then, $e(t) \in L_\infty$ and $\tilde{W}(t) \in L_\infty$. If, in addition, the real parts of all the infinitely many roots of the following characteristic equation $$\det(sI-(A_0+A_\tau e^{-\tau s}))=0 \quad (49)$$

have strictly negative real parts, then $x_r(t) \in L_\infty$, $\xi(t) \in L_\infty$, and $\lim_{t \to \infty} e(t)=0$.

Proof.

As a consequence of Lemma 1, recall that $e(t) \in L_\infty$ and $\tilde{W}(t) \in L_\infty$. In addition, note that $\varphi(.) \in L_\infty$ in (28). Therefore, if all of the roots of the characteristic equation given by (49) have strictly negative real parts, making the homogeneous equation $$\dot{\varphi}(t)=A_0\varphi(t)+A_\tau\varphi(t-\tau) \quad (50)$$

asymptotically stable, then, per Lemma 3, $\varphi(t) \triangleq [x_r^T(t), \xi^T(t)]^T \in L_\infty$. Finally, since $e(t) \in L_\infty$, $x_r(t) \in L_\infty$, and $\tilde{W}(t) \in L_\infty$ ensure the boundedness of (25), it now follows from the Barbalat's lemma that $\lim_{t \to \infty} e(t)=0$.

Note that there are several methods in the literature for the analysis of the root locations of (49). The four most-used methods are TRACE-DDE, DDE-BIFTOOL, QPMR, and Lambert-W function. In essence, one provides the matrices $A_0$ and $A_\tau$ as well as the delay $\tau$ to these methods, which then return the numerical values of the rightmost root locations of (49). In some sense, these methods perform a nontrivial approximation with which they are able to identify the most relevant roots—the rightmost roots. In the illustrative numerical example provided below, we employ TRACE-DDE readily available for download at https://users.dimi.uniud.it/~dimitri.breda/research/software/.

Illustrative Example

Consider the longitudinal motion of a Boeing 747 airplane linearized at an altitude of 40 kft and a velocity of 774 ft/sec with the dynamics given by $$\dot{x}(t)=A_p x(t)+B_p(u(t)+W^T\sigma(x(t))), \quad x(0)=x_0 \quad (51)$$

where $x(t)=[x_1(t),x_2(t),x_3(t),x_4(t)]^T$ is the state vector. Note that (51) can be equivalently written as (4) with $\Lambda=I$. Here, $x_1(t)$, $x_2(t)$, and $x_3(t)$ respectively represent the components of the velocity along the x, z and y axes of the aircraft with respect to the reference axes (in crad/sec), and $x_4(t)$ represents the pitch Euler angle of the aircraft body axis with respect to the reference axes (in crad). Recall that 0.01 radian=1 crad (centriradian). In addition, $u(t) \in \mathbb{R}$ represents the elevator control input (in crad). Finally, $W \in \mathbb{R}^3$ is an unknown weighting matrix and $\sigma(x(t))=[1, x_1(t), x_2(t)]^T$ is a known basis function. In the following simulations, we set W=[0.1 0.3 −0.3]. The dynamical system given in (51) is assumed to be controlled using a model reference adaptive controller. In addition, the aircraft is assumed to be operated by a pilot whose Neal-Schmidt Model is given by $$k_p \frac{T_p S + 1}{T_z S + 1} e^{-\tau s} \quad (52)$$

Where $k_p$ is the positive scalar pilot gain, $T_p$ and $T_z$ are positive scalar time constants, and $\tau$ is the pilot reaction time delay. The values of the parameters used in the simulations are provided in Table 1.

To obtain the nominal controller K, a linear quadratic regulator (LQR) approach is utilized with the following objective function to be minimized $$J(.)=\int_0^\infty (x^T(t)Qx(t)+\mu u^2(t))dt \quad (53)$$

where Q is a positive-definite weighting matrix of appropriate dimension and $\mu$ is a positive weighting scalar. Notice that the framework developed above is not limited to a particular design method for the nominal controller. To this end, this task can be handled by a number of different ways. Here LQR is utilized for convenience reasons. In this setting, the selection of the weighing matrices, as expected, will affect the resulting nominal controller gain K in (13), which in turn will determine the reference model dynamics (18). In the following simulation studies, the effect of the weighting matrices, and thus the effects of reference model parameters on system stability are investigated for various values of pilot model parameters. To facilitate the analysis, reference model parameter variations is achieved mainly by manipulating the control penalty variable $\mu$.

TABLE 1

| | |
|---|---|
| $T_p$ | 1 |
| $T_z$ | 5 |
| $\tau$ | 0.5 |
| $A_p$ | [−0.003 0.039 0 −0.322; −0.065 −0.319 7.740 0; 0.020 −0.101 −0.429 0; 0 0 1 0] |
| $B_p$ | [0.010; −0.1800; −1.160; 0] |
| $B_p$ | [0.0100 −0.1800 −1.1600 0]$^T$ |
| $E_p$ | [0 0 0 1] |
| $E_h$ | [0 0 0 1 0] |
| $B_r$ | [0 0 0 0 1]$^T$ |
| Q | diag([0 0 0 1 2.5]) |

Note that the purpose of the numerical examples provided in this section is to verify the theoretical stability predictions of the proposed framework. Therefore, the simulation results are created to present the stability/instability of the closed loop system without paying attention to enhanced transient response characteristics.

Delay-Independent Stability: LMI Approach:

We set $k_p=\frac{1}{2}$ without loss of generality and investigate whether or not the closed loop is delay-independent stable. Specifically, we first use the LQR control designer in MATLAB with $\mu=1.0$ to design K, which returns K=[−0.0185, 0.0815, −1.5809, −2.7560, −1.5811]. Next the matrices $A_0$ and $A_\tau$ are constructed based on the information provided on Table 1. Assigning P and S as positive definite variables greater than $0.5I \in \mathbb{R}^{(n+n_\xi) \times (n+n_\xi)}$ while imposing the negativity constraint in (32) as $F<-0.1I\in\mathbb{R}^{(n+n_\xi)\times(n+n_\xi)}$, the YALMIP LMI optimization toolbox returns a feasible set of matrices P and S, indicating that the closed-loop system is delay-independent stable.

Delay-Independent Stability: Frequency-Domain Approach:

To be consistent with the previous subsection, we set $k_p=\frac{1}{2}$ and $\mu=1.0$ in the LQR optimization. Based on Corollary 2, since $k_p<1$ and $A_r$ is Hurwitz, the necessary conditions for delay-independent stability are satisfied. Next, the sufficient conditions in Theorem 2 are to be checked simply by computing the metric in condition ii)-iii) of the theorem with respect to $\omega\geq 0$. We find out that the metric value starts at $k_p=\frac{1}{2}$ when $\omega=0$ (condition iii)) and decreases for larger $\omega\neq 0$ (condition ii)), remaining always less than 1. That is, the closed loop system will remain stable for any choice of delay $\tau$. Keeping $\mu=1.0$ but letting $k_p=0.95$ has only negligible effects on K, again with the system remaining delay independent stable under the conditions of Theorem 2. On the other hand, selecting $k_p=1.05$ violates the theorem and the system loses its delay-independent stability characteristics.

Delay-Dependent Stability: Effect of Control Penalty on System Stability for Different Pilot Reaction Time Delays:

To investigate the effects of the reference model parameter variations on the stability of the closed loop system, the control weight $\mu$ is manipulated by assigning values in the range [0, 50]. Then, the rightmost pole (RMP) of the system, whose characteristic equation is given by (49), is plotted against these $\mu$ values. This procedure is repeated for various pilot reaction time delays and the results are presented in FIG. 5.

Figure 5:
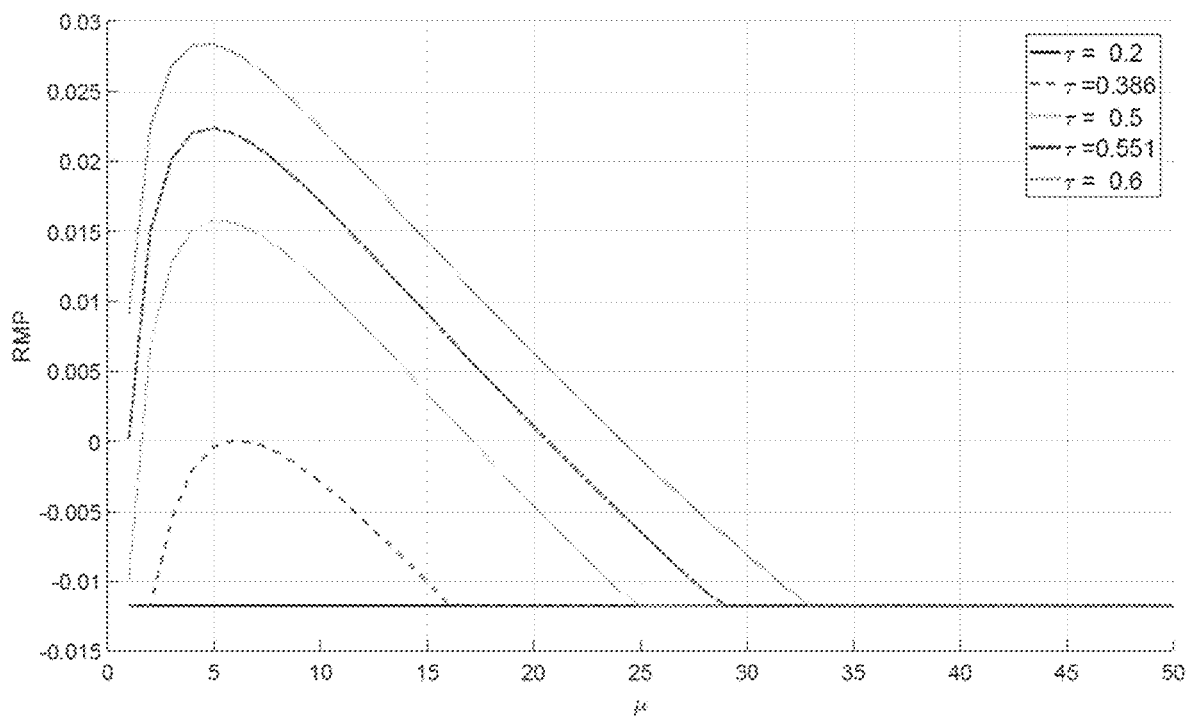
FIG. 5 is a graph of the location of the right most pole (RMP) of a characteristic equation representative of a human-in-the-loop MRAC with respect to a control penalty variable p for different pilot reaction times.

FIG. 5 reveals several interesting results. First, it is shown that if the reference model dynamics is not chosen carefully with an appropriate $\mu$ value, then the human-in-the-loop adaptive control system can be indeed unstable. Second, it is seen that the closed loop system can be stable for small and large values of the parameter[1] and be unstable in between. Third, it is observed that as the pilot reaction time delay increases, the unstable region of $\mu$ gets larger as indicated by RMP>0.

Figure 6:
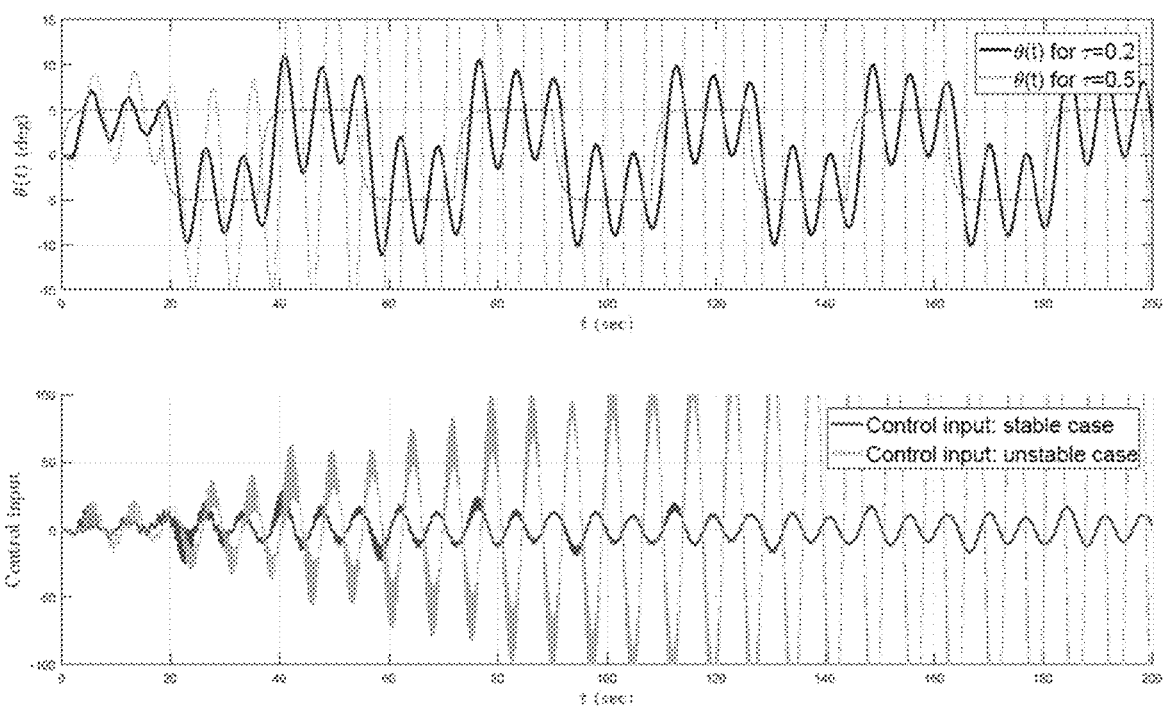
FIG. 6 is a graph of tracking and control signal curves for two different values of the pilot reaction times in the example of FIG. 5.

It is predicted in FIG. 5 that for $\mu=10$, pilot reaction time delays $\tau=0.2$ and $\tau=0.5$ results in a stable and unstable system, respectively. Time domain tracking and control signal plots presented in FIG. 6 confirm this prediction. As noted earlier, the simulation results are employed to verify the theoretical stability predictions of the proposed method and therefore controllers are not tuned to obtain the best transient response. The investigation of the effect of the human-controller interactions on the transient response will be addressed in future research.

Delay-Dependent Stability: Effect of Control Penalty on System Stability for Different Values of Pilot Model Poles:

The poles of the pilot model (52) represent how fast the pilot responds to changes in the aircraft pitch angle, which can also be interpreted as pilot aggressiveness. In this section, the effect of pilot aggressiveness on system stability is investigated while assigning values to the control penalty $\mu$ from 0 to 50.

Figure 7:
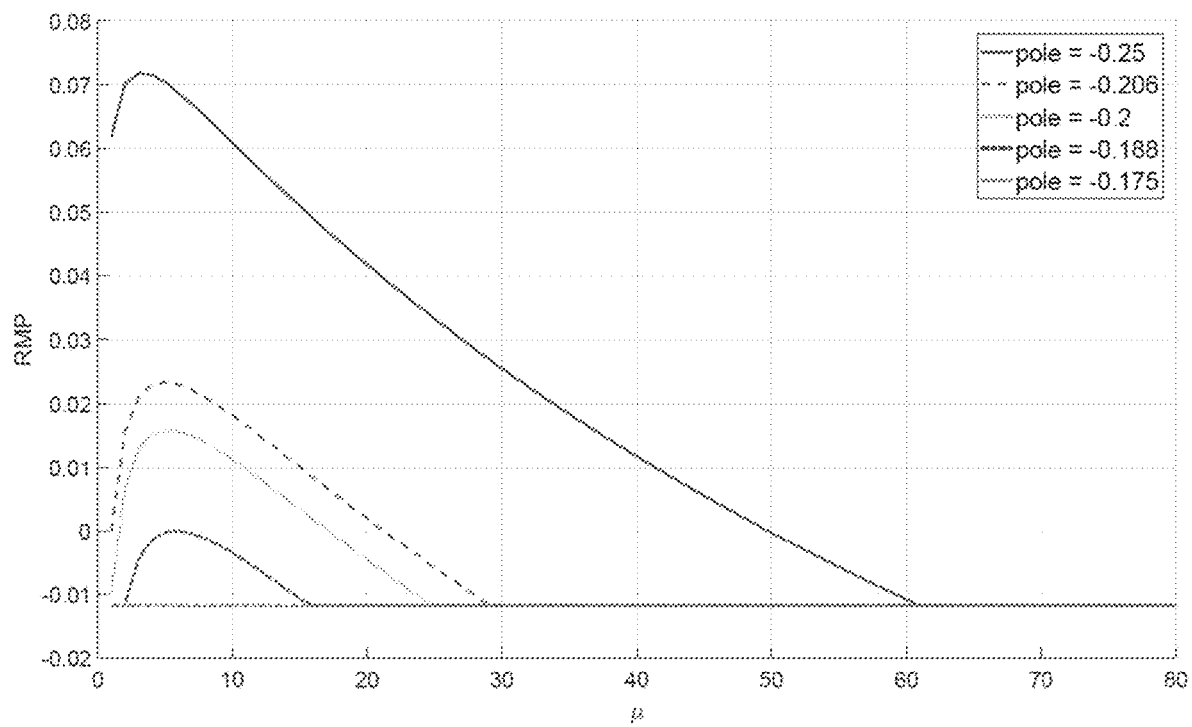
FIG. 7 is a graph of the location of the right-most pole (RMP) of the characteristic equation representative of the human-in-the-loop MRAC with respect to a control penalty variable $\mu$ for different pilot transfer function pole locations.

FIG. 7 depicts the effect of the pilot pole locations on the RMP. The zero location and the time-delay of the pilot model, are kept at their nominal values of $-1$ and 0.5, respectively. It is seen from the figure that, in general, stable-unstable-stable transition is observed for increasing values of $\mu$ and, as expected, higher values of poles, corresponding to faster pilot response, decrease the $\mu$ region of stability.

Figure 8:
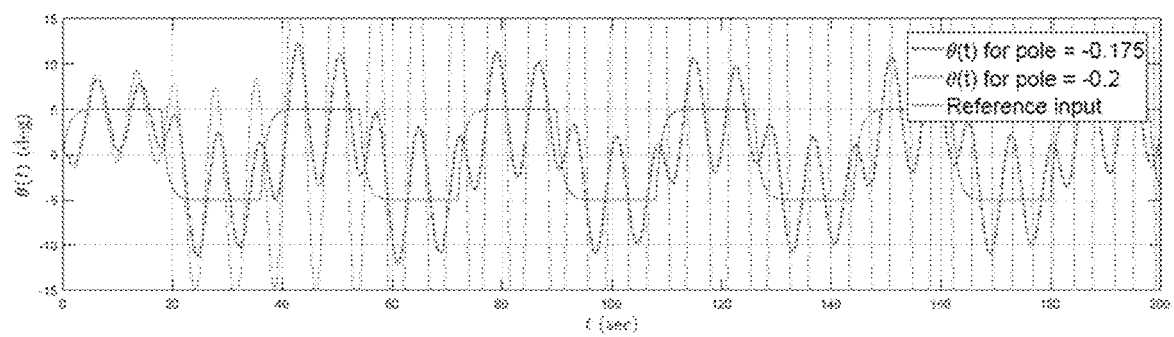
FIG. 8 is a graph of tracking and control signal curves for two different values of pilot transfer function pole locations.
Figure 8:
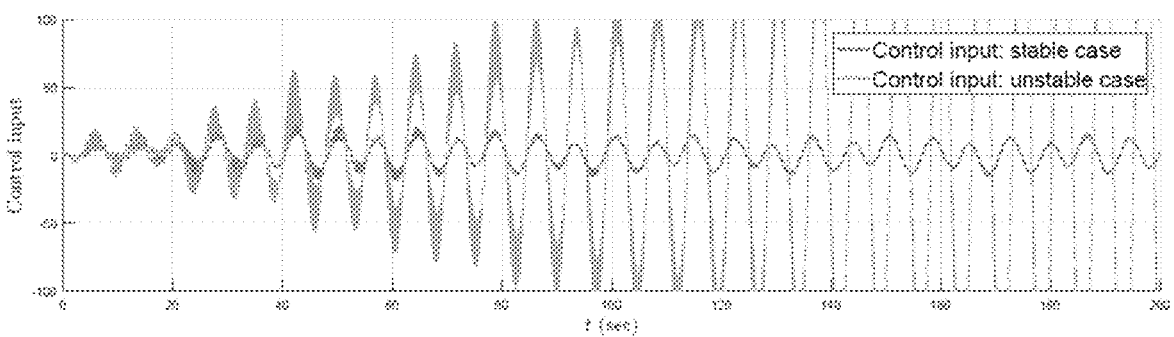

FIG. 8 depicts the tracking and control signal curves for two pilot model pole locations; that is, $-0.175$ and $-0.2$, when $\mu=10$. As predicted in FIG. 7, the closed loop system remains stable when the pole is located at $-0.175$ and becomes unstable when the pole is at $-0.2$.

Delay-Dependent Stability: Effect of Control Penalty on System Stability from Different Values of Pilot Model Zeros:

In this section, the effect of zeros of the pilot transfer function (52) on system stability is investigated when control penalty pi takes values in the range [0,50]. The pole location and the time delay of the pilot transfer function are kept at their nominal values of $-0.2$ and 0.5, respectively. Changes in the zero location of the model can be interpreted as an adjustment to the "lead" nature of the pilot, which is related to pilot's anticipation capabilities.

Figure 9:
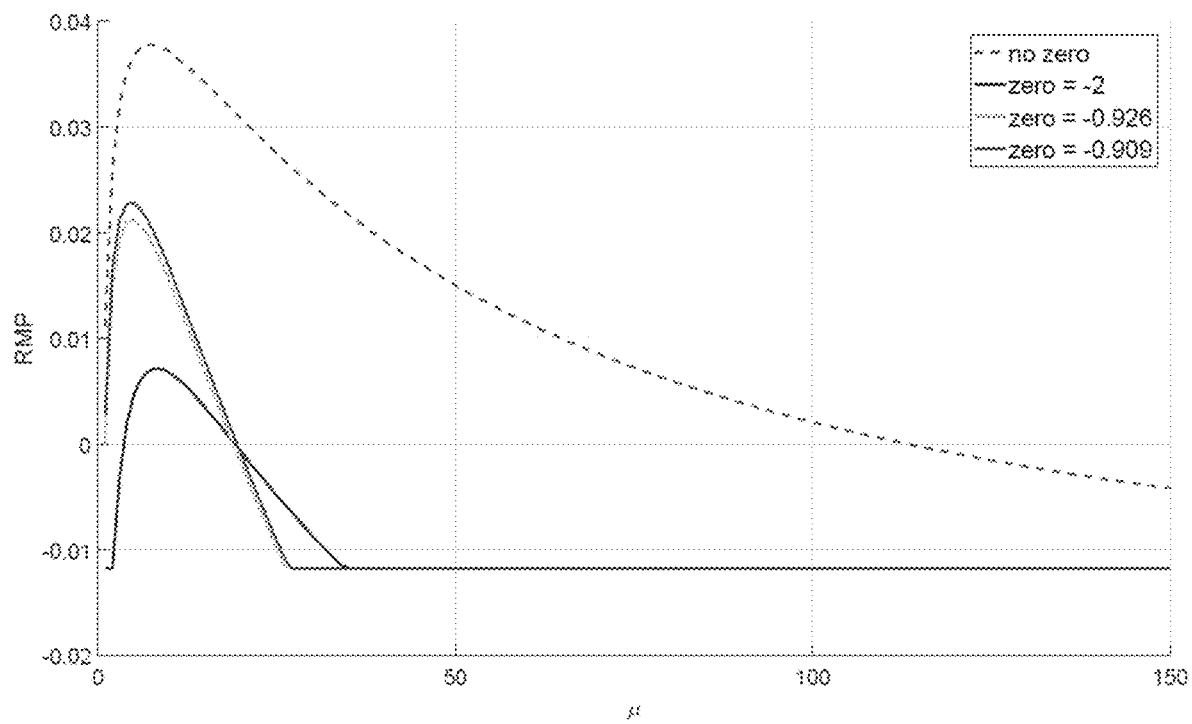
FIG. 9 is a graph of the location of the right-most pole (RMP) of the characteristic equation representative of the human-in-the-loop MRAC with respect to a control penalty variable $\mu$ for different pilot transfer function zero locations.

As seen in FIG. 9, stable-unstable-stable transition structure still exists, in general, for increasing $\mu$ values. Furthermore, it is seen that when the pilot transfer function does not have a zero, a large $\mu$ region of instability arises. It is noted that for the given nominal values of the system parameters, no value of zero can make the system always stable, regardless of the $\mu$ value, since delay-independence is determined only by the pilot's gain $k_p$.

Figure 10:
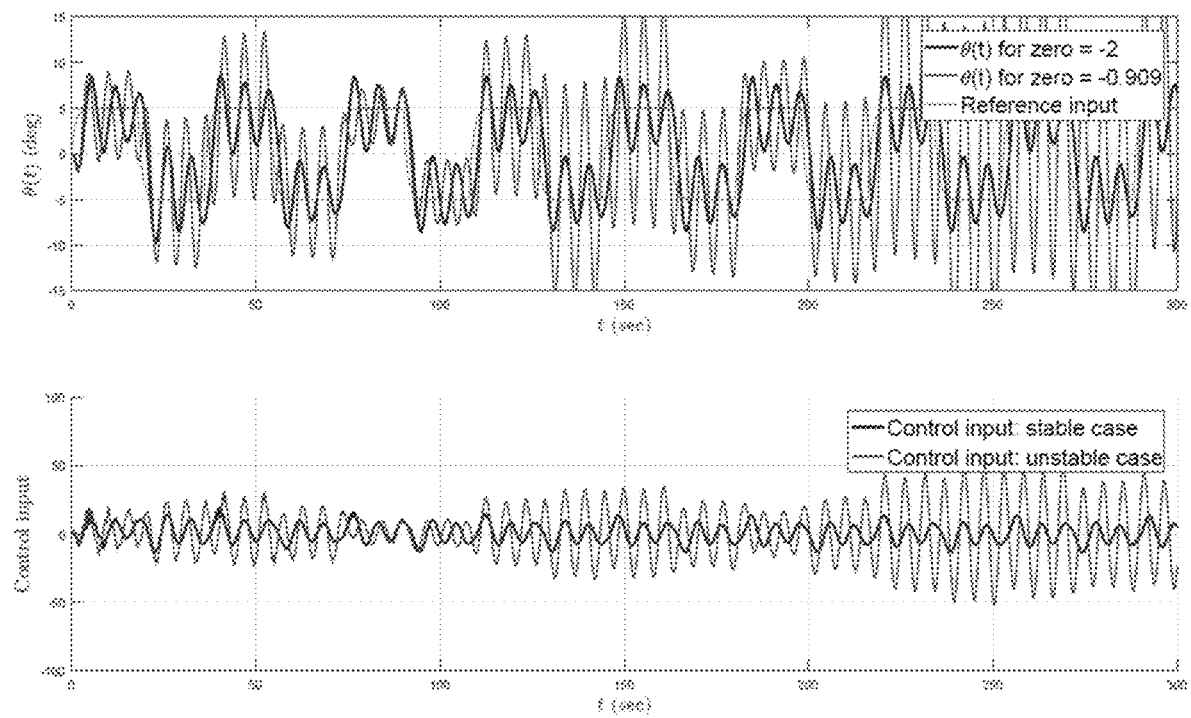
FIG. 10 is a graph of tracking and control signal curves for two different values of pilot transfer function zero locations.

FIG. 10 presents tracking and control signal curves for pilot model zero locations $-0.2$ and $-0.909$, for the case when $\mu=1$. As predicted in FIG. 9, the closed loop system becomes stable for the former and unstable for latter zero value.

Delay-Dependent Stability: Effect of Control Penalty on System Stability for Different Values of Pilot Model Gains:

The pilot gain in kp in (52) determines the intensity of the response that the pilot gives to the pitch angle deviations in the aircraft. In some sense, this gain also represents the aggressiveness of the pilot.

Figure 11:
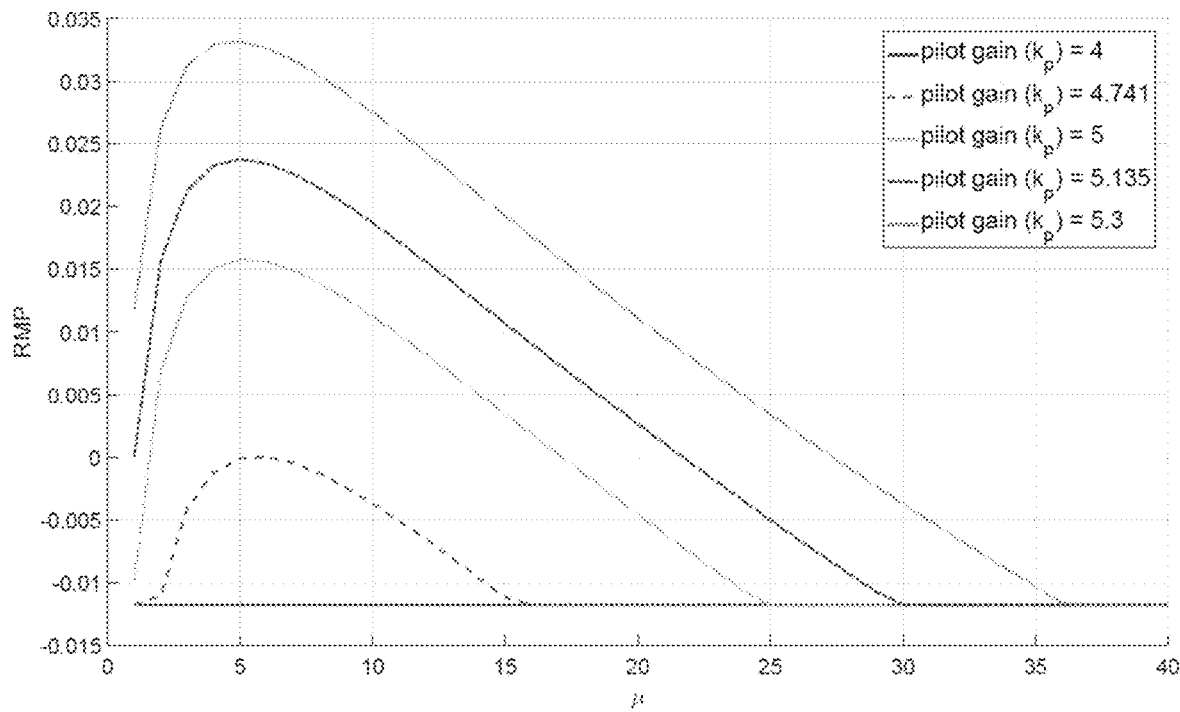
FIG. 11 is a graph of the location of the right-most pole (RMP) of the characteristic equation representative of the human-in-the-loop MRAC with respect to a control penalty variable $\mu$ for different pilot transfer function gain values.

Stability properties of the pilot-in-the-loop system depending on the nominal control penalty $\mu$ and the pilot gain $k_p$ is presented in FIG. 11, where the RMP vs $\mu$ is plotted for certain values of $k_p$. In these analyses, the pole and zero locations and time-delay of the pilot transfer function are kept at their nominal values of $-0.2$, $-1$, and 0.5, respectively. From the figure, stable-unstable-stable stability transition is once again observed for increasing values of $\mu$. On the other hand, it is seen that, similar to the trend for the pilot pole location, as the pilot gain increases, the $\mu$ stability region shrinks. These results confirm the well-known adverse effects of high gain of pilots on system stability, such as pilot-induced oscillations.

Figure 12:
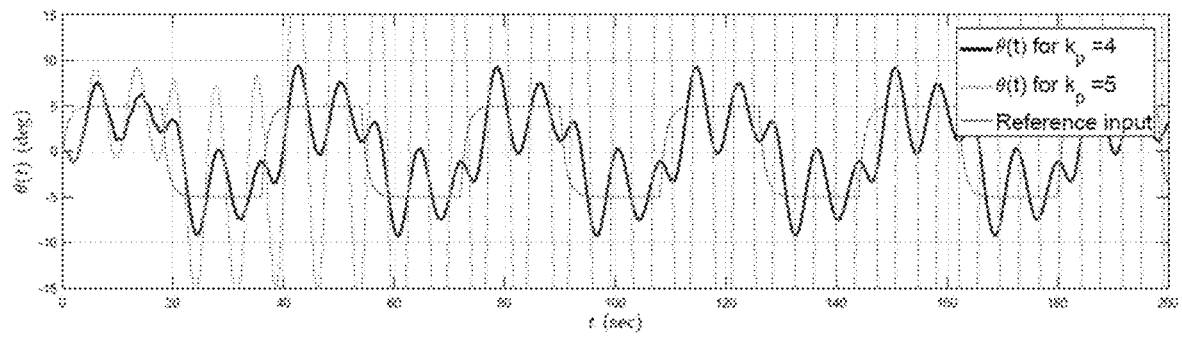
FIG. 12 is a graph of tracking and control signal curves for two different values of the pilot transfer function gain.
Figure 12:
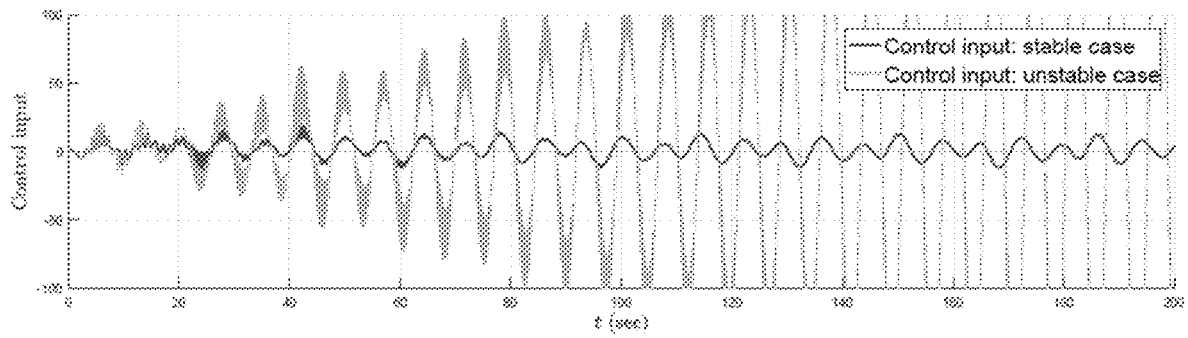

It is predicted in FIG. 11 that the closed loop system will be stable for $k_p=4$ and unstable for $k_p=5$, when $\mu=10$. This is confirmed by the results presented in FIG. 12, where time domain tracking and control signal curves are plotted for these gain values.

To summarize, the presented invention analyzed human-in-the-loop model reference adaptive control architectures and explicitly derived fundamental stability limit for both delay-independent and delay-dependent stability cases. Specifically, this stability limit results from the coupling between outer and inner loop architectures, where the outer loop portion includes the human dynamics modeled as a linear dynamical system with time delay and the inner loop portion includes the uncertain dynamical system, the reference model, the parameter adjustment mechanism, and the controller. We showed that when the given set of human model and reference model parameters satisfy this stability limit, the closed-loop system trajectories are guaranteed to be stable. The theoretical stability predictions of the proposed approach were verified via several simulation studies presented above. While the main focus of this invention was to reveal and compute stability limit of human-in-the-loop model reference adaptive control architectures, the effect of the controller design parameters on the transient response is also another important research direction that will be taken into consideration as a future research direction.

Figure 13:
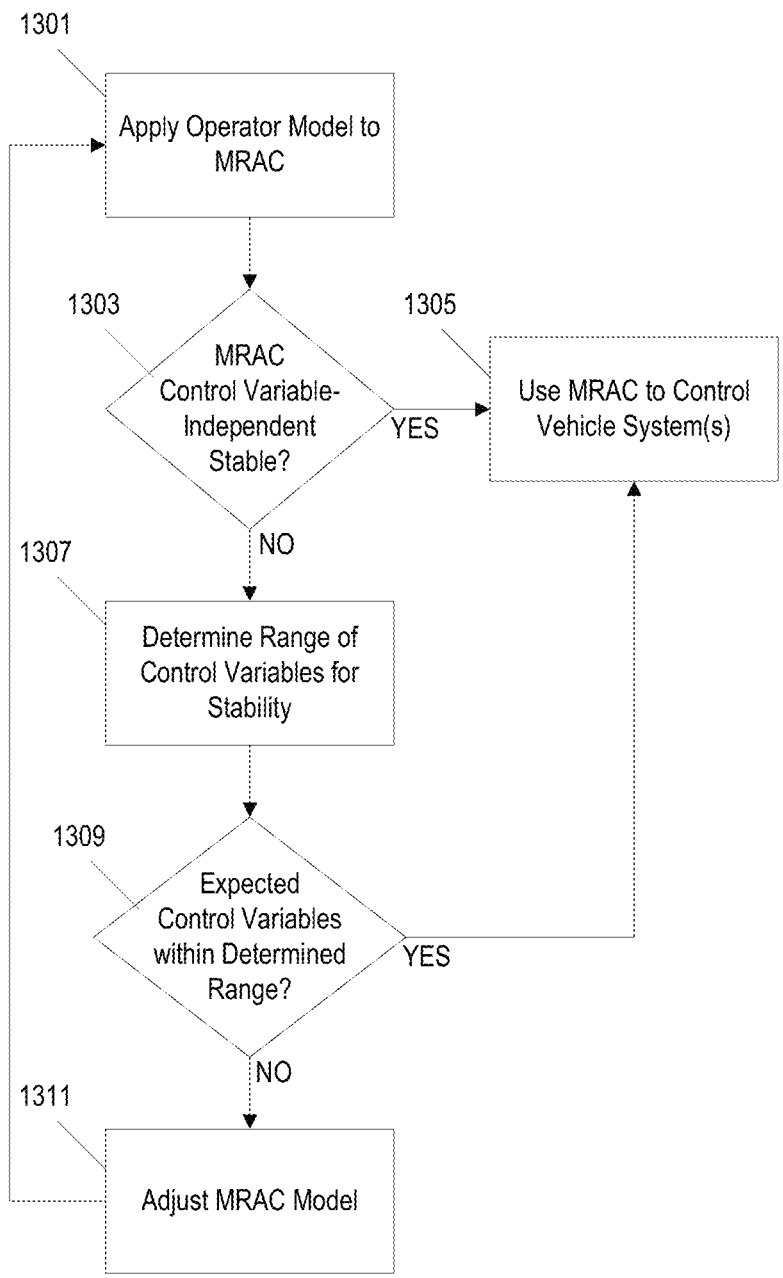
FIG. 13 is a flowchart of a method for validating the stability of an MRAC for use in the system of FIGS. 1 and 2.

The techniques described above can be applied and adapted in various ways. For example, FIG. 13 illustrates a method for using the techniques discussed above to validate a MRAC—that is, to determine whether a proposed MRAC will remain stable during operation. This method may be applied, for example, by an engineer while designing the MRAC and/or by a technician tuning the system for a particular user/use. The method of FIG. 13 may be fully or semi-automated by a computer system and results in a determination of whether the MRAC is acceptably stable or whether the MRAC should be adjusted or replaced in order to ensure stability.

The method begins by applying the operator model to the MRAC (step 1301), for example, as described above in reference to FIG. 4. The interactions of the operator/human model and the MRAC are then evaluated to determine whether the MRAC provides control-variable-independent stability (e.g., whether the MRAC enables the system operation to remain stable regardless of the time delay associated with a human operator's reaction to observed conditions) (step 1303). In implementations where the MRAC is being evaluated for time-delay-independent stability, the computer system may be configured to verify the delay-independent stability of the MRAC using the techniques outlined above in Theorem 1 and/or Theorem 2.

If the selected MRAC is confirmed to provide control-variable-independent stability for a selected control variable (e.g., time-delay-independent stability), then the MRAC is validated and the MRAC is used to control the vehicle system as illustrated in the example of FIG. 2 above (step 1305). However, if the MRAC does not provide control-variable-independent stability, a determined range of control variables is identified that provides stability (for example, using the techniques associated with Theorem 3, above) (step 1307). For example, the techniques described above can be used to determine a range of time delays, a range of pilot model poles, a range of pilot model zeros, and/or a range of pilot model gains that can be confirmed to provide stability (e.g., according to the techniques associated with Theorem 3 and the "Illustrative Example" described above). If the expected control variables for operation of the system (e.g., for the system itself, for a particular user, or for all users) fall within the determined range (step 1309), then the MRAC is validated as providing acceptable stability and is used to control the vehicle system as illustrated in the example of FIG. 2 above (step 1305). However, if the expected control variables for operation are outside of the range of variables that has been determined to provide for stability, then the MRAC must be either adjusted or replaced (step 1311).

In some implementations, the method of FIG. 13 is applied as a loop while adjusting particular parameters of a MRAC in order to tune the MRAC for stable operation. In other implementations, the method of FIG. 13 is applied to a plurality of different MRACs to determine which ones are acceptable (i.e., stable) and which ones are not.

Figure 14:
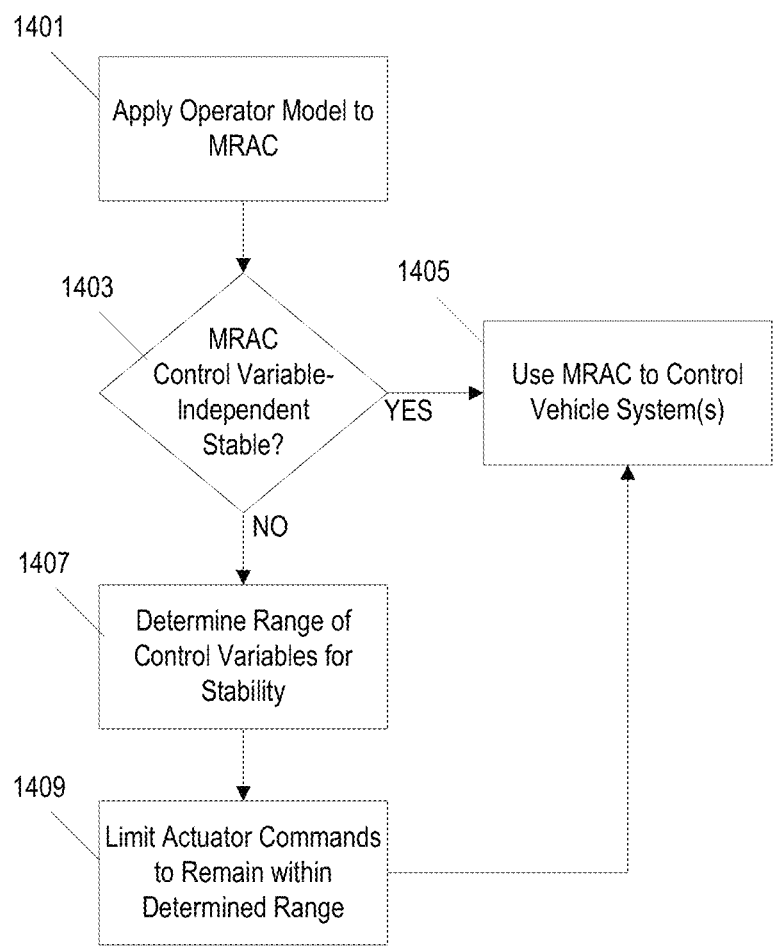
FIG. 14 is a flowchart of a method for tuning a controller based only determined stability limits of an MRAC for use in the system of FIGS. 1 and 2.

The techniques and framework described above can also be adapted to be govern the operation of a vehicle using the controller 101. FIG. 14 illustrates one example of a method utilizing the methods for evaluating stability and determining stability limits in order to regulate the actuator commands provided by the control signals from the controller 101 in response to particular user input commands. The human/operator model is again applied to the MRAC (step 1401) and the control-variable-independent stability of the MRAC (e.g., the time-delay-independent stability) is evaluated (step 1403). If the MRAC is determined to be stable independent of the particular control variable in question (e.g., time-delay), then the MRAC is validated and ready to use in controlling the vehicle (e.g., as illustrated in FIG. 2). However, if the MRAC is determined to not be stable for all control variables, a range of control variables is determined at which stability is expected (step 1407). Based on this determined range of stable control variables, the controller 101 (e.g., in the system of FIGS. 1 and 2) limits the actuator commands to ensure that the control variable(s) remain with the determined range (step 1409).

For example, in reference to FIGS. 7 and 8 and the associated discussion above, a MRAC has been validated as stable for particular pilot model poles indicative of levels of pilot aggressiveness. The controller 101 may be configured to adjust/regulate the actuator commands to limit the "aggressiveness" of aerial maneuvers to ensure that the performance of the airplane remains within the acceptable/stable range of control variables.

Thus, the invention provides, among other things, systems and methods for validating and ensuring the stability of a control architecture. Various features and advantages of the invention are set forth in the following claims.

What is claimed is:

1. A method of implementing a model reference adaptive control (MRAC) for a vehicle system, the method comprising:
    defining a first feedback-loop-based MRAC scheme, wherein the first feedback-loop based MRAC scheme is configured to
        receive a control command,
        apply a reference model to determine a desired action for the vehicle system based on the control command,
        determine an actuator command based on the control command, transmit the actuator command to at least one actuator of the vehicle system,
        monitor a sensor to determine an actual action of the vehicle system in response to application of the actuator command by the at least one actuator,
        determine a system error based on a difference between the desired action determined by the reference model and the actual action, and
        adjust at least one adaptive parameter used to determine the actuator command based on the determined system error;
    applying a first operator model to the first feedback-loop-based MRAC scheme, wherein the first operator model is configured to adjust the control command based at least in part on the actual action of the vehicle system and a reference action for the vehicle system with a time-delay;
    determining a stability limit of a first operating parameter of the first feedback-loop-based MRAC scheme based on the application of the first operator model to the first feedback-loop-based MRAC scheme; and
    validating the first feedback-loop-based MRAC scheme in response to determining that expected operating conditions of the first operating parameter are within the determined stability limit of the first operating parameter.

2. The method of claim 1, further comprising:
receiving, by an electronic process, the control command from a user control; and
controlling the vehicle system by an electronic processor configured to apply the first feedback-loop-based MRAC scheme to generate the actuator command in response to a control command received from a user control.

3. The method of claim 2, wherein receiving the control command from a user control includes receiving a control command from a steering wheel, wherein the control command is indicative of a rotational position of the steering wheel.

4. The method of claim 2, wherein determining the stability limit of the first operating parameter includes determining whether the first feedback-loop-based MRAC scheme will cause the system error to approach zero regardless of variations in the first operating parameter due to human operator-based manipulations of the user control.

5. The method of claim 2, wherein controlling the vehicle system by the electronic processor further includes:
determining, by the electronic processor, the actuator command based on the control command received from the user control and a previous actuator command value to ensure that the first operating parameter remains within the determined stability limit of the first operating parameter.

6. The method of claim 1, further comprising:
determining that the expected operating conditions of the first operating parameters are not within the determined stability limit of the first operating parameter and, in response, adjusting at least one parameter of the first feedback-loop-based MRAC scheme.

7. The method of claim 1, further comprising:
determining that the expected operating conditions of the first operating parameters are not within the determined stability limit of the first operating parameter and, in response, defining a second feedback-loop-based MRAC scheme and applying the first operator model to the second feedback-loop-based MRAC scheme.

8. The method of claim 1, wherein the first operating parameter of the first feedback-loop-based MRAC scheme includes a time-delay indicative of a period of time between an occurrence of the actual action and a corresponding corrective action applied by an operator to a user control.

9. The method of claim 8, wherein determining the stability limit of the first operating parameter of the first feedback-loop-based MRAC scheme includes determining whether the feedback-loop-based MRAC scheme will ensure that operation of the vehicle system remains stable regardless of a value of the time-delay parameter.

10. The method of claim 7, wherein determining the stability limit of the first operating parameter of the first feedback-loop-based MRAC scheme includes determining range of time-delay values for which the first feedback-loop-based MRAC scheme will ensure that operation of the vehicle system remains stable, and
wherein validating the first feedback-loop-based MRAC scheme includes determining that a range of expected time-delay values for the operator is within the determine range of time-delay values.

11. The method of claim 1, wherein the vehicle system includes an airplane control system and wherein the first feedback-loop-based MRAC scheme is configured to adjust the actuator to counteract an external force acting on the airplane and to maintain a desired path of travel.

12. The method of claim 11, wherein the external force acting on the airplane includes turbulence.

13. The method of claim 1, wherein the vehicle system includes an automobile system and wherein the first feedback-loop-based MRAC scheme is configured to regulate operation of at least one selected from a group consisting of an automobile steering system and an automobile braking system.

14. The method of claim 1, wherein applying the first operator model to the first feedback-loop-based MRAC scheme includes determining a mathematical model representative of the first operator model and apply the mathematical model of the first operator model to a mathematical model representative of the first feedback-loop-based MRAC scheme to determine an overall mathematical model representative of system operation under parallel control of both a human operator and the first feedback-loop-based MRAC scheme.

* * * * *